United States Patent
Liu et al.

(10) Patent No.: US 12,503,548 B2
(45) Date of Patent: Dec. 23, 2025

(54) ANION EXCHANGE POLYMERS AND MEMBRANES FOR ELECTROLYSIS

(71) Applicant: UOP LLC, Des Plaines, IL (US)

(72) Inventors: Chunqing Liu, Arlington Heights, IL (US); Xueliang Dong, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 771 days.

(21) Appl. No.: 17/662,676

(22) Filed: May 10, 2022

(65) Prior Publication Data

US 2023/0365744 A1 Nov. 16, 2023

(51) Int. Cl.

| | |
|---|---|
| *C08G 61/12* | (2006.01) |
| *B01J 41/09* | (2017.01) |
| *B01J 41/14* | (2006.01) |
| *C07D 209/86* | (2006.01) |
| *C07D 487/10* | (2006.01) |

(Continued)

(52) U.S. Cl.
CPC ............ *C08G 61/121* (2013.01); *B01J 41/09* (2017.01); *B01J 41/14* (2013.01); *C07D 209/86* (2013.01); *C07D 487/10* (2013.01); *C25B 9/23* (2021.01); *C25B 1/04* (2013.01)

(58) Field of Classification Search
CPC ........ C08G 61/121; C08G 10/00; B01J 41/09; B01J 41/14; B01J 41/05; B01J 41/13; B01J 47/12; C25B 9/23; C25B 13/08; C25B 1/04; Y02E 60/50; C08J 5/2256; C07D 487/10
See application file for complete search history.

(56) References Cited

U.S. PATENT DOCUMENTS

| | | | |
|---|---|---|---|
| 4,931,182 A | 6/1990 | Burgoyne, Jr. et al. | |
| 7,485,173 B1 | 2/2009 | Liu et al. | |

(Continued)

FOREIGN PATENT DOCUMENTS

| | | |
|---|---|---|
| CN | 104425829 A | 3/2015 |
| CN | 104829814 A | 8/2015 |

(Continued)

OTHER PUBLICATIONS

Cha et al., "Poly(carbazole)-based anion-conducting materials with high performance and durability for energy conversion devices", Energy Environ. Sci. 2020, 13, 3633-3645. (Year: 2020).*

(Continued)

*Primary Examiner* — James Lin
*Assistant Examiner* — Kevin Sylvester

(57) ABSTRACT

Anion exchange polymers comprise a plurality of repeating units of formula (I). The polymer may be synthesized from a super acid catalyzed polyhydroxyalkylation reaction of monomers $Ar_1'$, $Ar_2'$, and $X_1'$ to form a neutral precursor polymer followed by a Menshutkin reaction to convert the neutral precursor polymer to the anion exchange polymer.

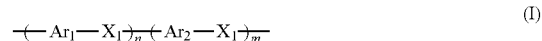

(I)

Anion exchange membranes and membrane electrode assemblies incorporating the anion exchange polymers are also described.

19 Claims, 3 Drawing Sheets

(51) Int. Cl.
  *C25B 9/23*     (2021.01)
  *C25B 1/04*     (2021.01)

(56) References Cited

U.S. PATENT DOCUMENTS

| | | | |
|---|---|---|---|
| 9,580,824 | B2 | 2/2017 | Masel et al. |
| 10,370,483 | B2 | 8/2019 | Kim et al. |
| 10,435,504 | B2 | 10/2019 | Bae et al. |
| 2005/0268783 | A1 | 12/2005 | Koros et al. |
| 2009/0178561 | A1 | 7/2009 | Miller et al. |
| 2009/0182097 | A1 | 7/2009 | Miller et al. |
| 2019/0036143 | A1* | 1/2019 | Yan ............ H01M 8/106 |
| 2020/0308341 | A1 | 10/2020 | Yan et al. |
| 2021/0009726 | A1 | 1/2021 | Yan et al. |
| 2023/0365744 | A1* | 11/2023 | Liu ............ C25B 13/08 |

FOREIGN PATENT DOCUMENTS

| | | | | |
|---|---|---|---|---|
| CN | 104829814 | B | * 4/2017 | |
| CN | 109320692 | A | 2/2019 | |
| CN | 109384908 | A | 2/2019 | |
| CN | 110862516 | A | 3/2020 | |
| CN | 110903449 | A | 3/2020 | |
| CN | 111303360 | A | 6/2020 | |
| CN | 112175170 | A | 1/2021 | |
| CN | 112175217 | A | 1/2021 | |
| CN | 113583279 | A | 11/2021 | |
| CN | 113956445 | A | 1/2022 | |
| CN | 113851683 | B | * 10/2023 | ............ C08G 61/124 |
| JP | 2016218140 | A | 12/2016 | |
| KR | 101546651 | B1 | 8/2015 | |
| KR | 20210071810 | A | 6/2021 | |
| KR | 20210071810 | A1 | 6/2021 | |
| WO | 2017190234 | A1 | 11/2017 | |
| WO | 2019068051 | A2 | 4/2019 | |
| WO | 2019076860 | A1 | 4/2019 | |
| WO | 2021172706 | A1 | 9/2021 | |

OTHER PUBLICATIONS

Chen et al., "Poly(fluorenyl aryl piperidinium) membranes and ionomers for anion exchange membrane fuel cells", Nat. Comm. 2021, 12, 1-12. (Year: 2021).*
Akiyama et al., "Chemically Stable, Highly Anion Conductive Polymers Composed of Quinquephenylene and Pendant Ammonium Groups" Macromolecules 2019, 52, 2131-2138. (Year: 2019).*
International Search Report from PCT application No. PCT/US2023/073078, mailed Dec. 18, 2023.
Written Opinion from PCT application No. PCT/US2023/073078, mailed Dec. 18, 2023.
Wang, Junhua et al., Poly(arly piperidinium) membranes and ionomers for hydroxide exchange membrane fuel cells, Nature Energy, https://doi.org/10.1038/s41560-019-0372-8.
Ye Liu et al., Chemical cross-linking modification of polyimide membranes for gas separation, Journal of Membrane Science 189 (2001) 231-239.
Chien-Chiang Chen et al., Plasticization-resistant hollow fiber membranes for CO2/CH4 separation based on a thermally crosslinkable polyimide, Journal of Membrane Science 382 (2011) 212-221.
Liu, Chunqing et al., U.S. Appl. No. 17/388,950, filed Jul. 29, 2021, entitled Ionically Conductive Asymmetric Composite Membranes for Electrochemical Energy Storage Applications.
Liu, Chunqing et al., U.S. Appl. No. 17/388,956, filed Jul. 29, 2021, entitled Sandwich-Structured Thin Film Composite Anion Exchange Membrane for Redox Battery Applications.
Liu, Chunqing et al., U.S. Appl. No. 17/389,032, filed Jul. 29, 2021, entitled Ionically Conductive Thin Film Composite Membranes for Energy Storage Applications.
Liu, Chunqing et al., U.S. Appl. No. 17/388,962, filed Jul. 29, 2021, entitled Electrolyte Compositions for Redox Flow Batteries.
Ba, Chaoyi, et al., U.S. Appl. No. 17/474,198, filed Sep. 14, 2021, entitled Anion Exchange Polymers and Membranes for Electroylsis.
International Search Report from PCT application No. PCT/IB2022/078207, mailed Feb. 1, 2023.
Written Opinion from PCT application No. PCT/IB2022/078207, completed Jan. 31, 2023.
Ryu, T. et al., Synthethis and characterization of block copolymer and comparative study with random copolymer via superacid-catalyzed reaction, International journal of hydrogen energy, 2018, vol. 43, pp. 11862-11871. Need.
Lee, S. et al., Synthesis and properties of sulfonated poly(N-methylisatin-biphenylene) proton exchange membrane by superacid-catalyzed polymerization, International journal of hydrogen energy, 2015, vol. 40, pp. 5390-5395. Need.
International Search Report from PCT application No. PCT/IB2022/078205, mailed Feb. 10, 2023.
Written Opinion from PCT application No. PCT/IB2022/078205, completed Feb. 10, 2023.
International Search Report from corresponding PCT application No. PCT/US2023/021186, mailed Aug. 28, 2023.
Written Opinion from corresponding PCT application No. PCT/US2023/021186, mailed Aug. 28, 2023.
International Search Report from PCT application No. PCT/US2023/082688, mailed Apr. 12, 2024.
Written Opinion from PCT application No. PCT/US2023/082688, mailed Apr. 12, 2024.
International Preliminary Report on Patentability from PCT application No. PCT/US2022/076294, issued Mar. 5, 2024.
Zhiyang Zhu et al., One-step synthesis of hdroxyl-functionalized fully carbon main chain PIMs via a Friedel-Crafts reaction for efficient gas separation, Separation and Purification Technology, 262, 2021, 118313.
Taewook Ryu et al., Synthesis and characterization of block copolymer and comparative study with random copolymer via superacide-catalyzed reaction, International Journal of Hydrogen Energy 43, (2018), 11862-11871.
Lillain I. Olvera et al., High thermomechanical stability and ion-conductivity of anion exchange membranes based on quaternized modified poly(oxyndoleterphenylene), Polymer Testing 95, 2021, 107092.
Soonho Lee et al., Synthesis and properties of sulfonated poly(N-methylisatin-biphenylene) proton exchange membrane by superacide-catalyzed polymerization, International Journal of Hydrogen Energy, 40, (2015), 5390-5395.
Extended European Search report from European application No. 22884615.0, dated Jul. 10, 2025.
M. Carmen et al., Novel, Metal-Free, Superacid-Catalyzed "Click" Reactions of Isatins with Linear, Nonactivated, Multiring Aromatic Hydrocarbons, Macromolecules, 2010, 43, 6968-6979.
Extended European Search Report from European application No. 22884614.3 dated Jul. 17, 2025.

* cited by examiner

ANION EXCHANGE POLYMERS AND MEMBRANES FOR ELECTROLYSIS

BACKGROUND

Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Eq. 1 below. The water electrolysis process is an endothermic process and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) water electrolysis (PEMWE as shown in FIG. 1), anion exchange membrane (AEM) water electrolysis (AEMWE as shown in FIG. 2), and solid oxide water electrolysis.

As shown in FIG. 1, in a PEMWE system 100, an anode 105 and a cathode 110 are separated by a solid PEM electrolyte 115 such as a sulfonated tetrafluoroethylene based cofluoropolymer sold under the trademark Nafion® by Chemours company. The anode and cathode catalysts typically comprise $IrO_2$ and Pt, respectively. At the positively charged anode 105, pure water 120 is oxidized to produce oxygen gas 125, electrons (e), and protons; the reaction is given by Eq. 2. The protons are transported from the anode 105 to the cathode 110 through the PEM 115 that conducts protons. At the negatively charged cathode 110, a reduction reaction takes place with electrons from the cathode 110 being given to protons to form hydrogen gas 130; the reaction is given by Eq. 3. The PEM 115 not only conducts protons from the anode 105 to the cathode 110, but also separates the $H_2$ gas 130 and $O_2$ gas 125 produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware such as the Pt-coated Ti bipolar plates, expensive noble metal catalysts required for the electrodes, as well as the expensive PEM.

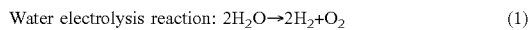

Water electrolysis reaction: $2H_2O \rightarrow 2H_2 + O_2$ (1)

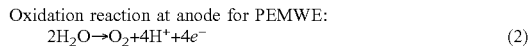

Oxidation reaction at anode for PEMWE:
$2H_2O \rightarrow O_2 + 4H^+ + 4e^-$ (2)

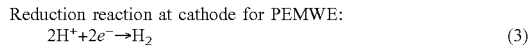

Reduction reaction at cathode for PEMWE:
$2H^+ + 2e^- \rightarrow H_2$ (3)

AEMWE is a developing technology. As shown in FIG. 2, in the AEMWE system 200, an anode 205 and a cathode 210 are separated by a solid AEM electrolyte 215. Typically, a water feed 220 with an added electrolyte such as dilute KOH or $K_2CO_3$ or a deionized water is fed to the cathode side. The anode and cathode catalysts typically comprise platinum metal-free Ni-based or Ni alloy catalysts. At the negatively charged cathode 210, water is reduced to form hydrogen 225 and hydroxyl ions by the addition of four electrons; the reaction is given by Eq. 4. The hydroxyl ions diffuse from the cathode 210 to the anode 205 through the AEM 215 which conducts hydroxyl ions. At the positively charged anode 205, the hydroxyl ions recombine as water and oxygen 230; the reaction is given by Eq. 5. The AEM 215 not only conducts hydroxyl ions from the cathode 210 to the anode 205, but also separates the $H_2$ 225 and $O_2$ 230 produced in the water electrolysis reaction. The AEM 215 allows the hydrogen 225 to be produced under high pressure up to about 35 bar with very high purity of at least 99.9%.

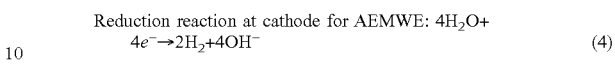

Reduction reaction at cathode for AEMWE: $4H_2O + 4e^- \rightarrow 2H_2 + 4OH^-$ (4)

Oxidation reaction at anode for AEMWE:
$4OH^- \rightarrow 2H_2O + O_2 + 4e^-$ (5)

AEMWE has an advantage over PEMWE because it permits the use of less expensive platinum metal-free catalysts, such as Ni and Ni alloy catalysts. In addition, much cheaper stainless steel bipolar plates can be used in the gas diffusion layers (GDL) for AEMWE, instead of the expensive Pt-coated Ti bipolar plates currently used in PEMWE. However, the largest impediments to the development of AEM systems are membrane hydroxyl ion conductivity and stability, as well as lack of understanding of how to integrate catalysts into AEM systems. Research on AEMWE in the literature has been focused on developing electrocatalysts, AEMs, and understanding the operational mechanisms with the general objective of obtaining a high efficiency, low cost and stable AEMWE technology.

Fuel cells, as a next generation clean energy resource, convert the energy of chemical reactions such as an oxidation/reduction redox reaction of hydrogen and oxygen into electric energy. The three main types of fuel cells are alkaline electrolyte fuel cells, polymer electrolyte membrane fuel cells, and solid oxide fuel cells. Polymer electrolyte membrane fuel cells may include proton exchange membrane fuel cells (PEMFC), anion exchange membrane fuel cells (AEMFC), and direct methanol fuel cells. PEMFC uses a PEM to conduct protons from the anode to the cathode, and it also separates the $H_2$ and $O_2$ gases to prevent gas crossover. AEMFC uses an AEM to conduct $OH^-$ from the cathode to the anode, and it also separates the $H_2$ and $O_2$ gases to prevent gas crossover.

The anode in an electrochemical cell is the electrode at which the predominant reaction is oxidation (e.g., the water oxidation/oxygen evolution reaction electrode for a water electrolyzer, or the hydrogen oxidation electrode for a fuel cell). The cathode in an electrochemical cell is the electrode at which the predominant reaction is reduction (e.g., the proton reduction/hydrogen evolution reaction electrode for a water electrolyzer, or the oxygen reduction electrode for a fuel cell). The membrane is one of the key materials that make up an electrolysis cell or a fuel cell and is an important driver for safety and performance. Some important properties for membranes for fuel cells and membrane electrolysis include high conductivity, high ionic permeability, high ionic exchange capacity (for ion-exchange membrane), high ionic/$H_2$ and $O_2$ selectivity (low $H_2$ and $O_2$ permeability/crossover), low price, low area resistance to minimize efficiency loss resulting from ohmic polarization, high resistance to oxidizing and reducing conditions, being chemically inert at a wide pH range, high thermal stability together with high proton conductivity, and high mechanical strength (thickness, low swelling).

Significant advances are needed in cost-effective, high performance, stable catalysts, membrane materials, as well as other cell stack components for AEM water electrolysis and AEMFCs with a wide range of applications in renewable energy systems.

DESCRIPTION OF THE INVENTION

Figure 1:
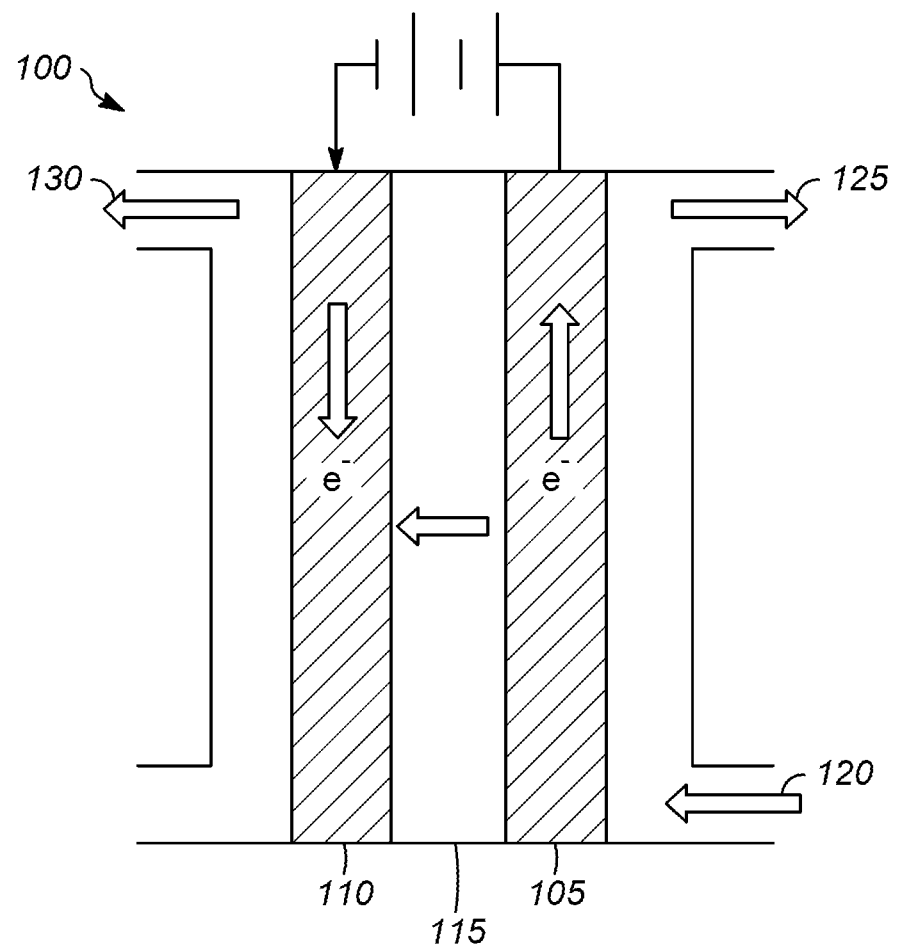
FIG. 1 is an illustration of one embodiment of a PEMWE cell.
Figure 2:
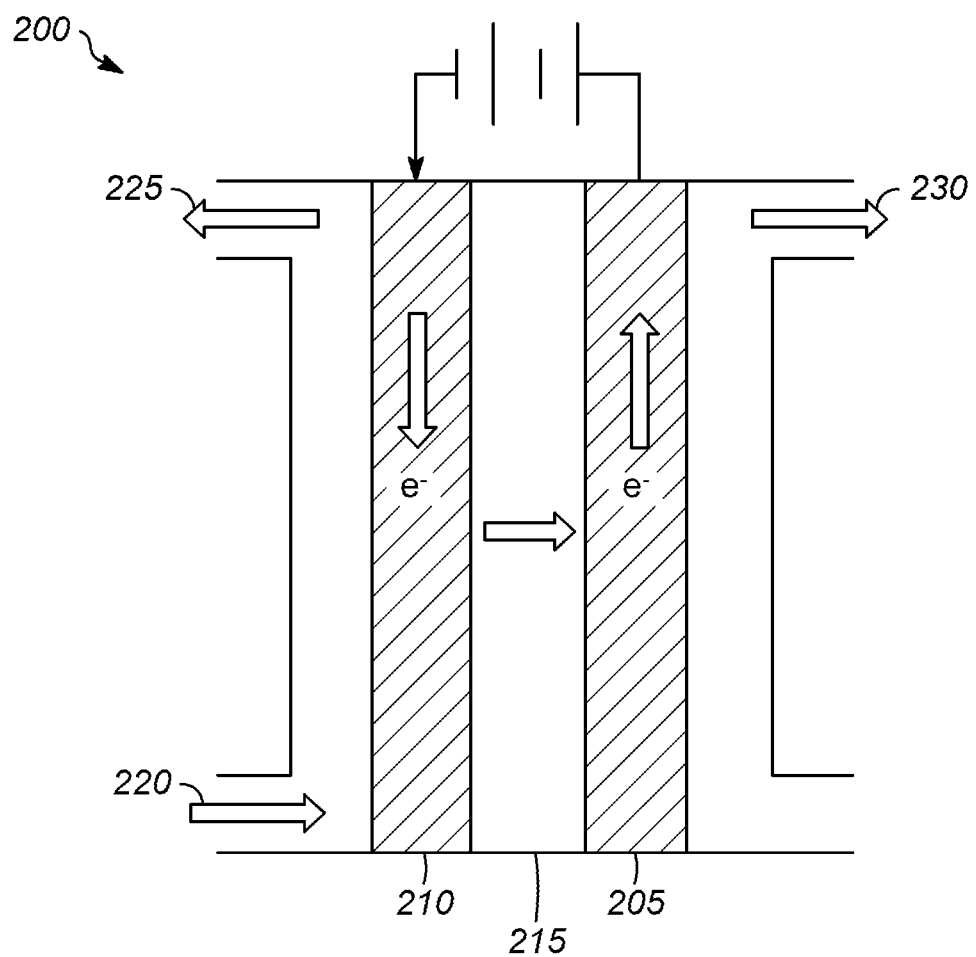
FIG. 2 is an illustration of one embodiment of a AEMWE cell.

Novel anion exchange polymers comprising a plurality of repeating units of formula (I)

$$-(-Ar_1-X_1-)_n-(-Ar_2-X_1-)_m- \quad (I)$$

have been developed for the preparation of AEMs. The anion exchange polymers have stable hydrophobic polymer backbones and at least two different types of stable hydrophilic quaternary ammonium cationic groups on the polymer side chains. Cationic groups, like piperidinium, quaternized carbazole derivative, quaternized phenothiazine derivative, or piperidinium salt, were covalently incorporated into the polymers for the preparation of novel AEMs. Therefore, these polymers provide high OH⁻ conductivity, high chemical stability, low swelling in alkaline water at about 60-120° C., and high mechanical stability. The anion exchange polymers can be used for electrolysis, such as water or $CO_2$ electrolysis, as well as other uses such as redox flow batteries, and fuel cell applications.

The anion exchange polymers were designed to: enhance OH⁻ conductivity by incorporating a quaternized carbazole derivative, or a quaternized phenothiazine derivative, or both into the polymer side chain comprising piperidinium or a piperidinium salt; improve the chemical stability of the polymer by having an polymer backbone free of ether bonds; and increase polymer backbone rigidity and molecular weight to enhance the mechanical strength of the polymer. The polymers have hydrophilic polymer side chains, at least two different types of stable hydrophilic quaternary ammonium cationic groups, such as quaternized carbazole derivative and piperidinium ion-conducting functional groups, or quaternized phenothiazine derivative and piperidinium ion-conducting functional groups, and polymer backbones free of ether bonds, which enable efficient and stable operation in water or $CO_2$ electrolysis, redox flow battery, and fuel cell applications.

One aspect of the invention is an anion exchange polymer. In one embodiment, the polymer comprises a plurality of repeating units of formula (I)

$$-(-Ar_1-X_1-)_n-(-Ar_2-X_1-)_m- \quad (I)$$

wherein $Ar_1$ is selected from the group consisting of:

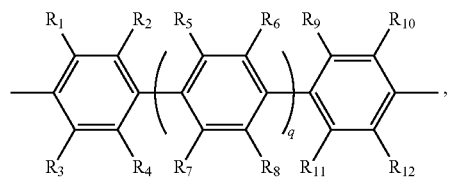

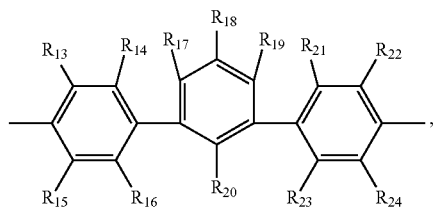

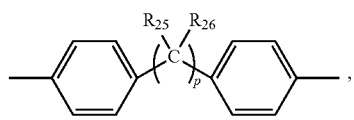

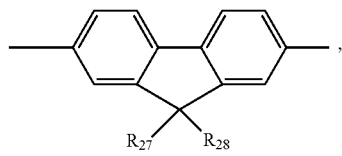

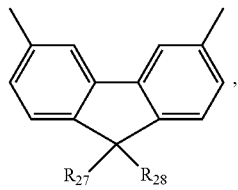

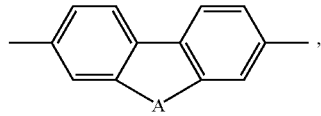

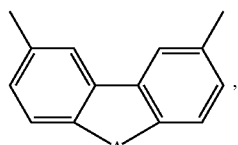

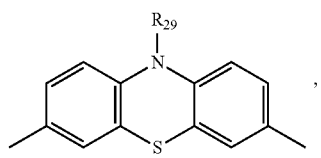

and mixtures thereof;

$Ar_2$ is selected from the group consisting of:

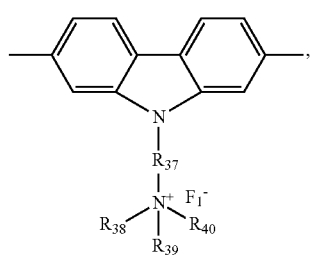

-continued
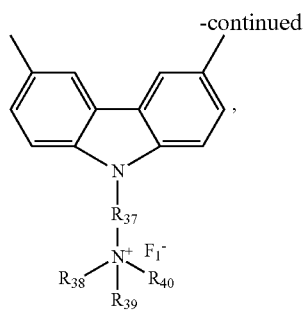
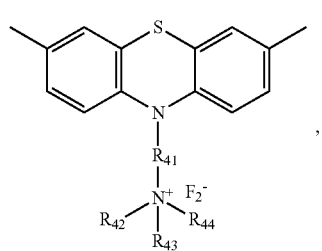
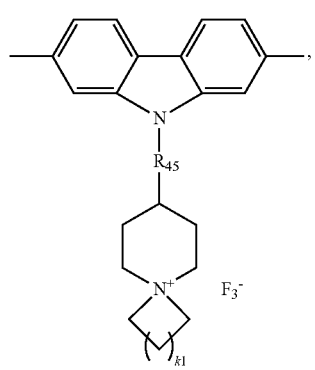
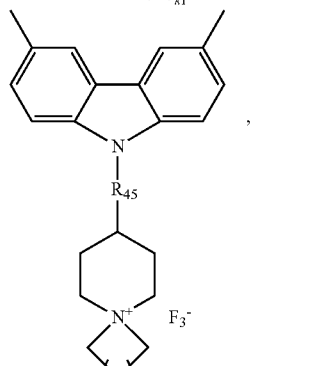
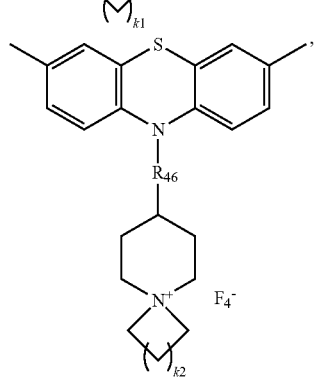
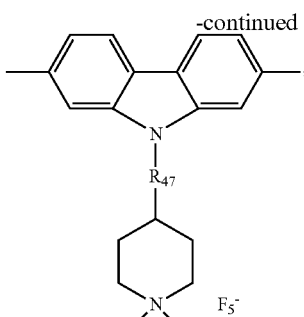
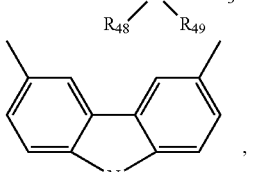
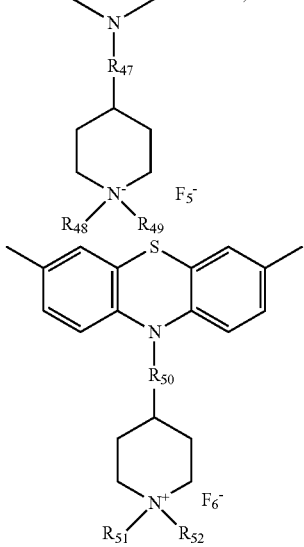
and mixtures thereof;
$X_1$ is selected from the group consisting of:
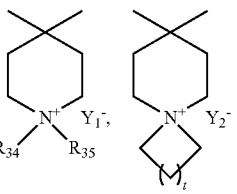
optionally,
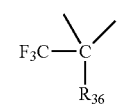
and mixtures thereof
wherein $F_1^-$-$F_6^-$, $Y_1^-$, and $Y_2^-$ are each independently anions;
wherein $R_1$-$R_{28}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group;

wherein $R_{29}$, $R_{34}$, and $R_{35}$ are each independently hydrogen, an alkyl group, an alkenyl group, an alkynyl group, or an aryl group, and the alkyl, alkenyl, alkynyl or aryl groups are optionally substituted with a halide or a positively charged functional group;

wherein $R_{36}$ is an alkyl group, an alkenyl group, an alkynyl group, or an aryl group, and the alkyl, alkenyl, alkynyl or aryl group is optionally substituted with a halide or a positively charged functional group;

wherein $R_{37}$-$R_{52}$ are each independently an alkyl group, an alkenyl group, an aryl group, or combinations thereof;

wherein A is O, S, or $NR_{100}$;

wherein $R_{100}$ is hydrogen, an alkyl group, an alkenyl group, an alkynyl group, or an aryl group, and the alkyl, alkenyl, alkynyl, or aryl groups are optionally substituted with a halide or a positively charged functional group;

wherein m and n are independently integers from 5 to 500 and the molar ratio of n/m is in a range of 1:20 to 20:1;

wherein p is 1, 2, 3, or 4;

wherein q is 0, 1, 2, or 3; and wherein t, $k_1$, and $k_2$ are independently 1, 2, 3, 4, 5, or 6.

In some embodiments, $Ar_1$ is selected from the group consisting of

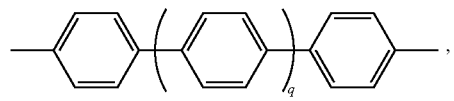

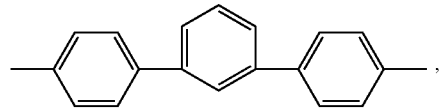

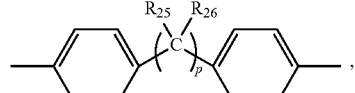

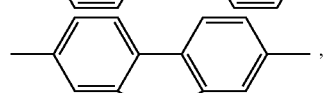

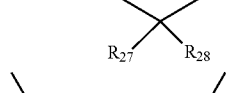

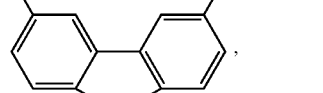

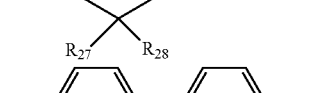

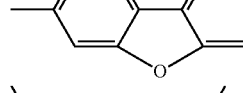

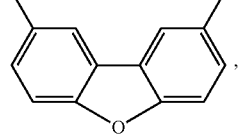

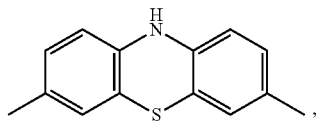

and mixtures thereof, wherein $R_{25}$, $R_{26}$, $R_{27}$, and $R_{28}$ are each independently —H or —$CH_3$;

wherein p is 1 or 2; and wherein q is 0 or 1.

In some embodiments, $Ar_2$ is selected from the group consisting of

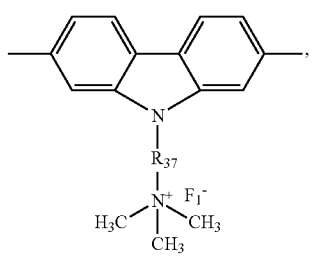

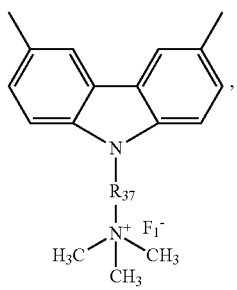

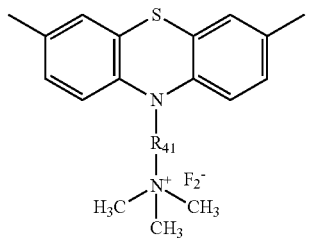

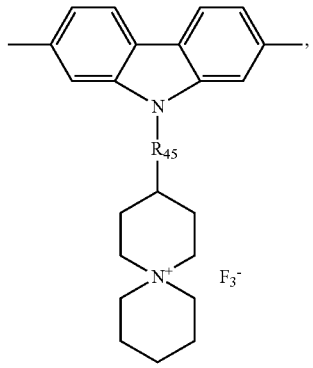

-continued

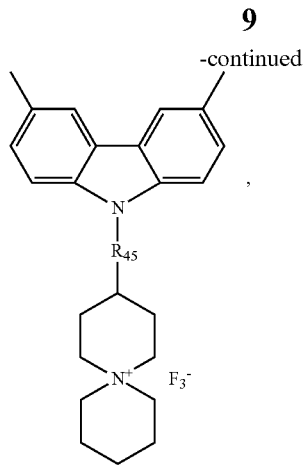

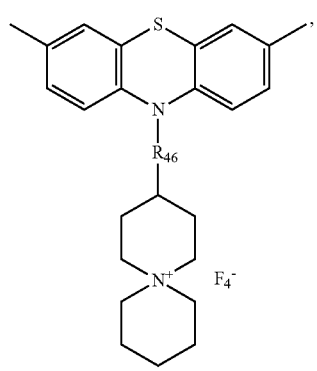

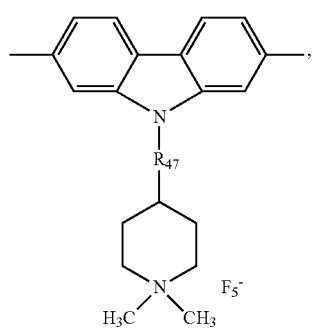

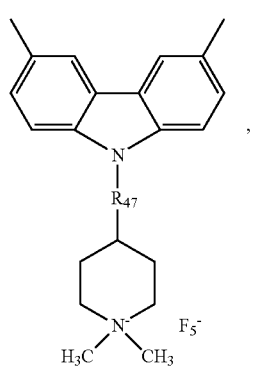

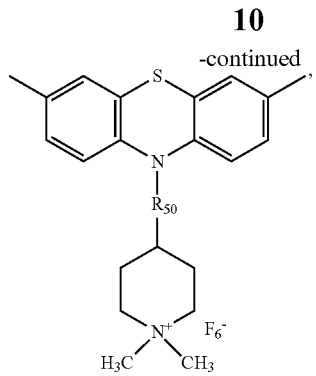

and mixtures thereof, wherein $R_{37}$, $R_{41}$, $R_{45}$, $R_{46}$, $R_{47}$, and $R_{50}$ are each independently —$CH_2$—, —$(CH_2)_2$—, —$(CH_2)_3$—, —$(CH_2)_4$—, —$(CH_2)_5$—, —$(CH_2)_6$—, or —$C_6H_4$—; and wherein $F_1^-$-$F_6^-$ are each independently $OH^-$, $I^-$, or $Br^-$.

In some embodiments, $X_1$ is

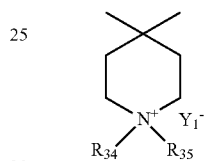

and wherein $R_{34}$ and $R_{35}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $Y_1^-$ is $OH^-$ or $I^-$.

In some embodiments, $X_1$ is

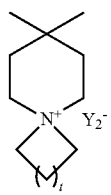

wherein t is 1, 2, 3, 4, 5, or 6; and wherein $Y_2^-$ is $OH^-$ or $I^-$.

In some embodiments, $X_1$ is a mixture of

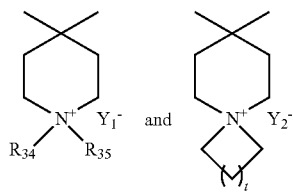

wherein $R_{34}$ and $R_{35}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein t is 1, 2, 3, 4, 5, or 6; and wherein $Y_1^-$ and $Y_2^-$ are the same and are selected from $OH^-$ or $I^-$.

In some embodiments, $X_1$ is a mixture of

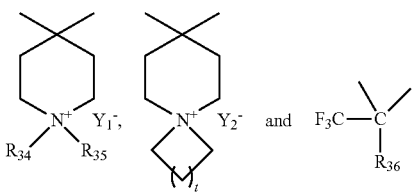

wherein $R_{34}$ and $R_{35}$ are each independently —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$;

wherein $R_{36}$ is —CH$_3$, —CH$_2$CH$_3$, —C$_6$H$_5$, or —(CH$_2$)$_5$—N$^+$(CH$_3$)$_3$;

wherein t is 1, 2, 3, 4, 5, or 6; and wherein $Y_1^-$ and $Y_2^-$ are the same and are selected from OH$^-$ or I$^-$.

In some embodiments, the polymer comprising a plurality of repeating units of formula (I) is formed from a superacid catalyzed polyhydroxyalkylation reaction of monomers $Ar_1'$, $Ar_2'$, and $X_1'$, followed by a Menshutkin reaction, wherein $Ar_1'$ is selected from the group consisting of:

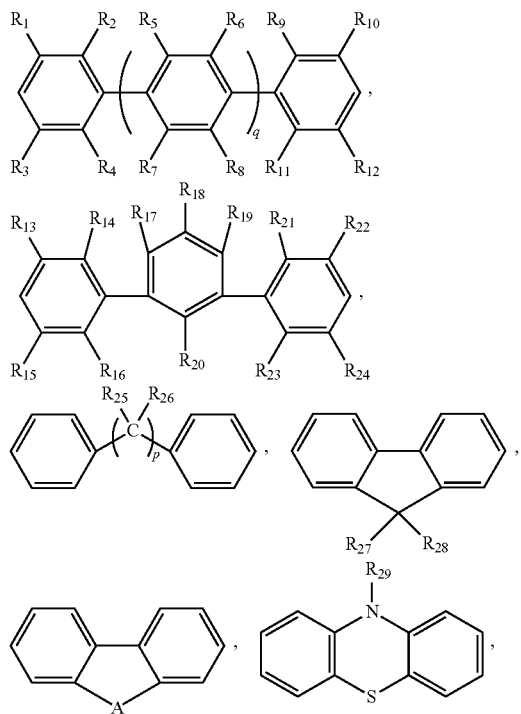

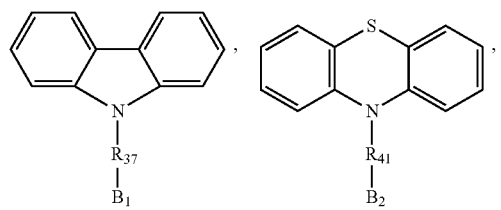

and mixtures thereof;

$Ar_2'$ is selected from the group consisting of:

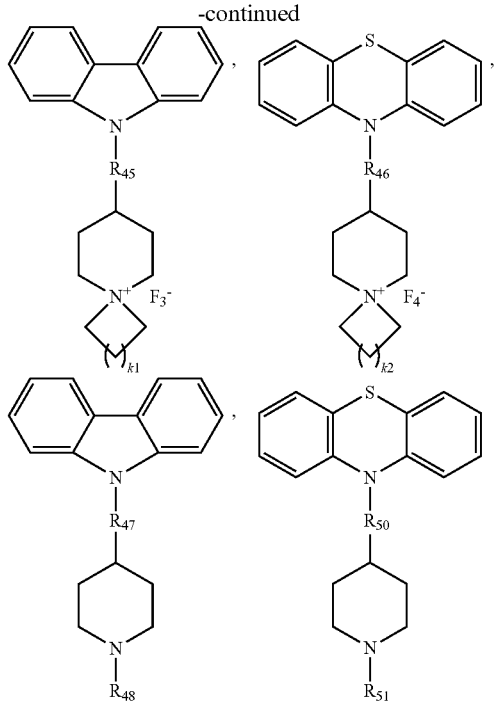

and mixtures thereof; and $X_1'$ is selected from the group consisting of:

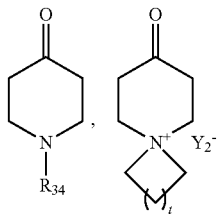

optionally

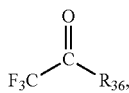

and mixtures thereof;

wherein $Y_2^-$, $F_3^-$, and $F_4^-$ are each independently an anion;

wherein $R_1$-$R_{28}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group;

wherein $R_{29}$, $R_{34}$, $R_{48}$, and $R_{51}$ are each independently hydrogen, an alkyl group, an alkenyl group, an alkynyl group, or an aryl group, and the alkyl, alkenyl, alkynyl or aryl groups are optionally substituted with a halide or a positively charged functional group;

wherein $R_{36}$ is an alkyl group, an alkenyl group, an alkynyl group, or an aryl group, and the alkyl, alkenyl, alkynyl or aryl group is optionally substituted with a halide or a positively charged functional group;

wherein $R_{37}$, $R_{41}$, $R_{45}$, $R_{46}$, $R_{47}$, and $R_{50}$ are each independently an alkyl group, an alkenyl group, an aryl group, or combinations thereof;

wherein A is O, S, or $NR_{100}$;

wherein $R_{100}$ is hydrogen, an alkyl group, an alkenyl group, an alkynyl group, or an aryl group, and the alkyl, alkenyl, alkynyl, or aryl groups are optionally substituted with a halide or a positively charged functional group;

wherein $B_1$ and $B_2$ are each independently a halide functional group;

wherein p is 1, 2, 3, or 4;

wherein q is 0, 1, 2, or 3; and wherein t is 1, 2, 3, 4, 5, or 6.

In some embodiments, $Ar_1'$ is selected from the group consisting of:

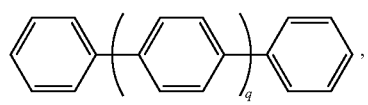,

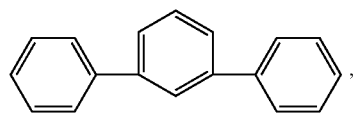,

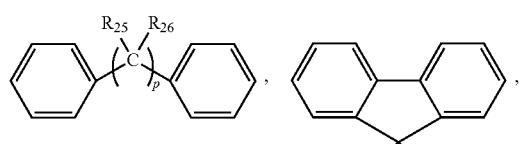,

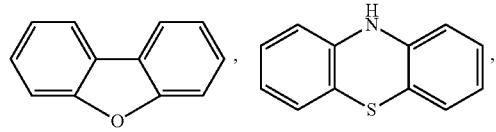, and mixtures thereof, wherein $R_{25}$, $R_{26}$, $R_{27}$, and $R_{28}$ are each independently —H or —$CH_3$;

wherein p is 1 or 2; and wherein q is 0 or 1.

In some embodiments, $Ar_2'$ is selected from the group consisting of:

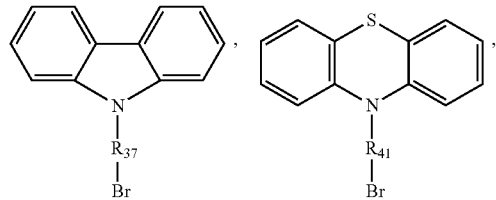

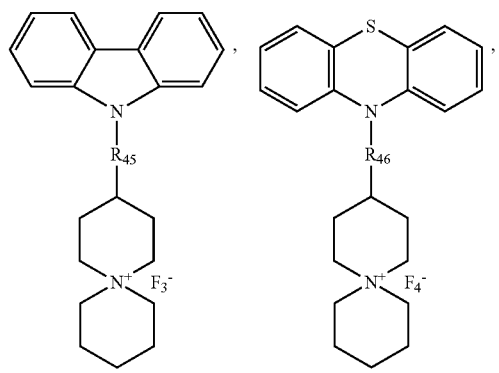

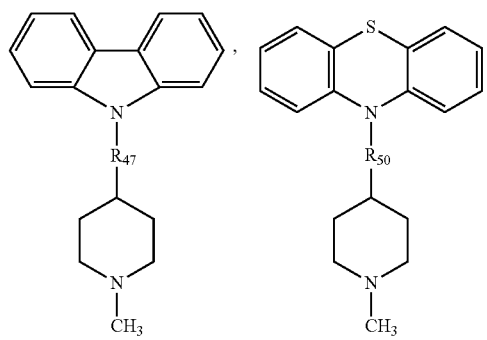

and mixtures thereof;

wherein $R_{37}$, $R_{41}$, $R_{45}$, $R_{46}$, $R_{47}$, and $R_{50}$ are each independently —$CH_2$—, —$(CH_2)_2$—, —$(CH_2)_3$—, —$(CH_2)_4$—, —$(CH_2)_5$—, —$(CH_2)_6$—, or —$C_6H_4$—;

wherein $F_3^-$ and $F_4^-$ are independently $Br^-$ or $I^-$.

In some embodiments, $X_1'$ is

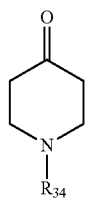

and wherein $R_{34}$ is —H, —$CH_3$, —$CH_2CH_3$, —$CH(CH_3)_2$, —$C(CH_3)_3$, —$CH_2$—$C_6H_5$, or —$CH_2$—$CH(CH_3)_2$.

In some embodiments, $X_1'$ is

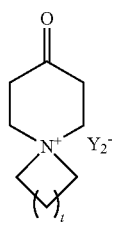

and wherein t is 1, 2, 3, 4, 5, or 6;

wherein $Y_2^-$ is $Br^-$ or $I^-$.

In some embodiments, $X_1'$ is a mixture of

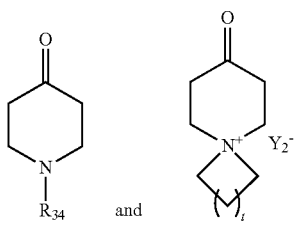

wherein $R_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$;
wherein $Y_2^-$ is Br$^-$ or I$^-$; and
wherein t is 1, 2, 3, 4, 5, or 6.

In some embodiments, $X_1'$ is a mixture of

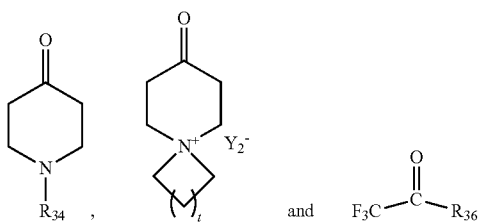

wherein $R_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$;
wherein $R_{36}$ is —CH$_3$, —CH$_2$CH$_3$, —C$_6$H$_5$, or —(CH$_2$)$_5$—N$^+$(CH$_3$)$_3$;
wherein $Y_2^-$ is Br$^-$ or I$^-$; and
wherein t is 1, 2, 3, 4, 5, or 6.

The anion exchange polymer comprising a plurality of repeating units of formula (I) may be synthesized by two steps: 1) a superacid catalyzed polyhydroxyalkylation reaction of monomers $Ar_1'$ and $Ar_2'$ with $X_1'$, such as p-terphenyl as $Ar_1'$ and 9-(6-bromohexyl)-9H-carbazole as $Ar_2'$ with N-methyl-4-piperidone as $X_1'$, to form a neutral precursor polymer; and 2) a Menshutkin reaction to convert the neutral precursor polymer with functional groups, such as 9-(6-bromohexyl)-9H-carbazole and piperidine-based groups, to the anion exchange polymer comprising a plurality of repeating units of formula (I) with anion-conducting functional groups, such as piperidinium-based cation groups and quaternized carbazole derivative cation groups such as 9-(6-trimethylammonium bromide)hexyl-9H-carbazole. Optionally, the anion exchange polymer comprising a plurality of repeating units of formula (I) with anion-conducting functional groups, such as piperidinium-based cation groups, quaternized carbazole derivative cation groups, and negatively charged halide ions is converted to an anion exchange polymer comprising a plurality of repeating units of formula (I) with anion-conducting functional groups, such as piperidinium-based cation groups, quaternized carbazole derivative cation groups, and negatively charged OH$^-$ ions by soaking in a base solution before the polymer is made into a membrane.

The polyhydroxyalkylation reaction of monomers $Ar_1'$ and $Ar_2'$ with monomer $X_1'$ provides an anion exchange polymer with a polymer backbone free of ether bonds, which results in high chemical stability of the polymer. The incorporation of electron-rich monomer $Ar_1'$ into the anion exchange polymer provides a hydrophobic polymer backbone and the incorporation of carbazole or phenothiazine derivative monomer $Ar_2'$ into the anion exchange polymer provides quaternized carbazole derivative or quaternized phenothiazine derivative anion-conducting functional groups, or both. The incorporation of monomer $Ar_2'$ and $X_1'$ into the anion exchange polymer provides the polymer with two different types of stable hydrophilic quaternary ammonium cationic groups such as quaternized carbazole derivative and piperidinium ion-conducting functional groups, quaternized phenothiazine derivative and piperidinium ion-conducting functional groups that help achieve stable high OH$^-$ conductivity. In some cases, the monomer $X_1'$ is a mixture of a piperidone-based monomer and a non-piperidone-based monomer to enable the formation of a high molecular weight anion exchange polymer. The combination of the hydrophobic polymer backbone, the hydrophilic polymer side chains, and at least two different types of alkaline stable hydrophilic quaternary ammonium cationic groups provides the novel anion exchange polymer with high OH$^-$ conductivity, high chemical stability, high mechanical strength, and long-term performance stability. The molar ratio of $Ar_1'$ monomer to $Ar_2'$ monomer can be in a range of 20:1 to 1:20, or in a range of 10:1 to 1:10, or in a range of 5:1 to 1:5. The molar ratio of $X_1'$ monomer to $Ar_1'$ and $Ar_2'$ monomers can be in a range of 1.2:1 to 1:1.2, or in a range of 1.1:1 to 1:1.1, or in a range of 1.05:1 to 1:1.05.

The superacid catalyzed polyhydroxyalkylation reaction can be carried out at −10° C. to 50° C., or at −5° C. to 30° C., or at −5° C. to 25° C. for 2 h to 72 h, or 10 h to 48 h, or 12 to 24 h. Suitable superacid catalysts include, but are not limited to, trifluoromethanesulfonic acid (CF$_3$SO$_3$H (TFSA)), methanesulfonic acid (MSA), fluorosulfuric acid (FSO$_3$H), or mixtures thereof. Solvents for the polyhydroxyalkylation reaction are those that can dissolve one or more of the monomers. Suitable solvents include, but are not limited to, methylene chloride, chloroform, trifluoroacetic acid (TFA), or mixtures thereof.

The Menshutkin reaction is used to react the neutral precursor polymer with an alkyl halide, or with an trialkyl amine first followed by an alkyl halide to convert the neutral precursor polymer to the anion exchange polymer comprising a plurality of repeating units of formula (I) with two different types of stable hydrophilic quaternary ammonium cationic groups, such as quaternized carbazole derivative and piperidinium ion-conducting functional groups, or quaternized phenothiazine derivative and piperidinium ion-conducting functional groups. Suitable alkyl halides include, but are not limited to, alkyl iodides or alkyl bromides. Suitable alkyl amines include, but are not limited to, trimethyl amine or triethyl amine. The Menshutkin reaction can be carried out at 10° C. to 80° C., or at 20° C. to 30° C. for 2 h to 72 h, or 10 h to 48 h, or 12 to 24 h. Solvents for the Menshutkin reaction are those that can dissolve the neutral precursor polymer. Suitable solvents include, but are not limited to, N-methylpyrrolidone (NMP), N,N-dimethyl acetamide (DMAC), N,N-dimethylformamide (DMF), dimethyl sulfoxide (DMSO), 1,3-dioxolane, or mixtures thereof.

The anion exchange polymer comprising a plurality of repeating units of formula (I) has a weight average molecular weight in a range of 10,000 to 1,000,000 Daltons, or in a range of 50,000 to 500,000 Daltons.

Another aspect of the invention is an anion exchange membrane comprising the polymer described above. The anion exchange membrane may be used in a wide variety of applications including, but not limited to, fuel cells, electrolyzers, flow batteries, electrodialyzers, waste metal recovery systems, electrocatalytic hydrogen production systems, desalinators, water purifiers, waste water treatment systems, ion exchangers, or $CO_2$ separators.

In some embodiments, the anion exchange membrane comprises a nonporous symmetric dense film membrane, an integrally-skinned asymmetric membrane, a reinforced composite membrane, or a thin film composite membrane. By "dense" we mean that the membrane does not have pores larger than 1 nm.

In some embodiments, the reinforced composite membrane or the thin film composite membrane comprises a porous substrate membrane impregnated or coated with the anion exchange polymer. The porous substrate membrane is prepared from a polymer different from the anion exchange polymer.

In some embodiments, the nonporous symmetric dense film membrane, the integrally-skinned asymmetric membrane, the reinforced composite membrane, or the thin film composite membrane may be a flat sheet membrane.

In some embodiments, the nonporous symmetric dense film anion exchange membrane is prepared using a method comprising: 1) dissolving the anion exchange polymer in a solvent to form a polymer casting solution; 2) casting the polymer casting solution on a nonporous substrate to form a uniform layer of the polymer casting solution; 3) drying the polymer casting solution layer to form a dried membrane on the nonporous substrate at 50° C. to 180° C., or at 50° C. to 120° C., or at 80° C. to 120° C.; and optionally 4) ion exchanging the halide anions of the anion exchange polymer in the membrane with hydroxide, bicarbonate, carbonate ions, or a combination thereof to form the nonporous symmetric dense film anion exchange polymer membrane. The nonporous substrate is removed from the membrane when the membrane is used in a desired application. The solvent used to dissolve the anion exchange polymer can be selected from, but is not limited to, NMP, DMAc, DMF, DMSO, 1,3-dioxolane, or mixtures thereof. The nonporous substrate used for the fabrication of the nonporous symmetric dense film membrane can be selected from, but is not limited to, glass plate, polyolefin film, polyester film, or fluorocarbon-based polymer film such as poly(tetrafluoroethylene) (PTFE) and poly(vinylidene fluoride) (PVDF) film.

In some embodiments, the integrally-skinned asymmetric anion exchange membrane is prepared using a method comprising: 1) making an anion exchange polymer membrane casting solution comprising the anion exchange polymer with formula (I), solvents which are miscible with water and can dissolve the anion exchange polymer, and non-solvents which cannot dissolve the anion exchange polymer; 2) casting a layer of the anion exchange polymer membrane casting solution onto a supporting substrate; 3) evaporating the solvent and non-solvent from the surface of the coated layer and then coagulating the coated polymer layer in a coagulating bath to form the integrally-skinned asymmetric membrane structure; 5) drying the membrane at 50° C. to 150° C., or at 50° C. to 120° C., or at 80° C. to 120° C.; and optionally 6) ion exchanging the halide anions of the anion exchange polymer in the membrane with hydroxide, bicarbonate, carbonate ions, or a combination thereof to form the integrally-skinned asymmetric anion exchange polymer membrane. In some embodiments, the supporting substrate is removed from the membrane when the membrane is used in a desired application. In some embodiments, the supporting substrate is part of the final integrally-skinned asymmetric anion exchange polymer membrane. The supporting substrate may comprise polyolefin such as polypropylene and polyethylene, polyester, polyamide such as Nylon 6 and Nylon 6,6, cellulose, or fluorocarbon-based polymer such as PTFE and PVDF. The solvents for the preparation of the integrally-skinned asymmetric membrane include, but are not limited to, NMP, DMAc, DMF, DMSO, dioxanes, 1,3-dioxolane, and mixtures thereof. The non-solvents for the preparation of the integrally-skinned asymmetric membrane include, but are not limited to, acetone, methanol, ethanol, tetrahydrofuran (THF), toluene, n-octane, n-decane, lactic acid, citric acid, isopropanol, and mixtures thereof. The integrally-skinned asymmetric membrane may have a thin nonporous dense layer less than 500 nm on a microporous support layer.

In some embodiments, the reinforced composite anion exchange membrane is prepared using a method comprising: 1) dissolving the anion exchange polymer in a solvent to form a polymer solution; 2) impregnating a porous matrix support membrane with the anion exchange polymer solution to fill the pores with the anion exchange polymer via dip-coating, soaking, spraying, painting, or other known conventional solution impregnating method; 3) drying the impregnated membrane at 50° C. to 150° C., or at 50° C. to 120° C., or at 80° C. to 120° C.; and optionally 4) ion exchanging the halide anions of the anion exchange polymer in the pores of the reinforced membrane with hydroxide, bicarbonate, carbonate ions, or a combination thereof to form the reinforced composite anion exchange membrane with interconnected anion exchange polymer domains in a porous matrix. The solvents for the preparation of the thin film composite anion exchange membrane include, but are not limited to, NMP, DMAc, DMF, DMSO, dioxanes, 1,3-dioxolane, and mixtures thereof. The porous matrix should have good thermal stability (stable up to at least 120° C.), high stability under high pH condition (e.g., pH greater than 8), high resistance to oxidizing and reducing conditions (insoluble and no performance drop under oxidizing and reducing conditions), high mechanical strength (no dimensional change under the system operation conditions), as well as other factors dictated by the operating conditions for electrochemical reactions. The porous matrix must be compatible with the electrochemical cell chemistry and meet the mechanical demands of cell stacking or winding assembly operations.

The polymers suitable for the preparation of the porous matrix can be selected from, but not limited to, polyolefins such as polyethylene and polypropylene, polyamide such as Nylon 6 and Nylon 6,6, polyester, cellulose acetate, polybenzimidazole, fluorocarbon-based polymer such as PTFE and PVDF, polycarbonate, cellulose, or combinations thereof. These polymers provide a range of properties such as low cost, high stability in alkaline water, good mechanical stability, and ease of processability for porous matrix fabrication.

The porous matrix can either a non-woven matrix or a woven matrix and have either a symmetric porous structure or an asymmetric porous structure. The porous matrix can be formed by an electrospinning process, a phase inversion membrane fabrication approach followed by direct air drying, or by phase inversion followed by solvent exchange methods. The porous matrix also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the pores. The wet processing of polyolefin porous matrix is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the porous matrix can be in a range of 10-400 micrometers, or a range of 10-200 micrometers, or a range of 10-100 micrometers, or a range of 20-100 micrometers. The pore size of the porous matrix can be in a range of 1 micrometer to 500 micrometers, or a range of 10 micrometer to 200 micrometers, or a range of 50 micrometers to 100 micrometer.

In some embodiments, the thin film composite anion exchange membrane is prepared using a method comprising: 1) dissolving the anion exchange polymer in a solvent to form a polymer coating solution; 2) coating a layer of the anion exchange polymer coating solution on one surface of a microporous support membrane via dip-coating, meniscus coating, spin coating, casting, soaking, spraying, painting, or other known conventional solution coating technologies; 3) drying the coated membrane at 50° C. to 150° C., or at 50° C. to 120° C., or at 80° C. to 120° C.; and optionally 4) ion exchanging the halide anions of the anion exchange polymer in the coating layer with hydroxide, bicarbonate, carbonate ions, or a combination thereof to form the thin film composite anion exchange membrane. The solvents for the preparation of the thin film composite anion exchange membrane include, but are not limited to, NMP, DMAc, DMF, DMSO, dioxanes, 1,3-dioxolane, and mixtures thereof. The microporous support membrane should have good thermal stability (stable up to at least 120° C.), high stability under high pH condition (e.g., pH greater than 8), high resistance to oxidizing and reducing conditions (insoluble and no performance drop under oxidizing and reducing conditions), high mechanical strength (no dimensional change under the system operation conditions), as well as other factors dictated by the operating conditions for electrochemical reactions. The microporous support membrane must be compatible with the electrochemical cell chemistry and meet the mechanical demands of cell stacking or winding assembly operations.

The polymers suitable for the preparation of the microporous support membrane can be selected from, but not limited to, polyolefins such as polyethylene and polypropylene, polyamide such as Nylon 6 and Nylon 6,6, polyester, cellulose acetate, polybenzimidazole, fluorocarbon-based polymer such as PTFE and PVDF, polycarbonate, cellulose, or combinations thereof. These polymers provide a range of properties such as low cost, high stability in alkaline water, good mechanical stability, and ease of processability for membrane fabrication.

The microporous support membrane can have either a symmetric porous structure or an asymmetric porous structure. The asymmetric microporous support membrane can be formed by a phase inversion membrane fabrication approach followed by direct air drying, or by phase inversion followed by solvent exchange methods. The microporous support membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of polyolefin separators is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the microporous support membrane can be in a range of 10-400 micrometers, or a range of 10-200 micrometers, or a range of 10-100 micrometers, or a range of 20-100 micrometers. The pore size of the microporous membrane can be in a range of 10 nanometers to 50 micrometers, or a range of 50 nanometers to 10 micrometers, or a range of 0.2 micrometers to 1 micrometer.

Another aspect of the invention is a membrane electrode assembly. In one embodiment, the membrane electrode assembly comprises: an anion exchange membrane comprising the polymer described above; an anode comprising an anode catalyst on a first surface of the anion exchange membrane; and a cathode comprising a cathode catalyst on a second surface of the anion exchange membrane; and In some embodiments, the membrane electrode assembly further comprises: an anode porous transport layer adjacent to the anode; and a cathode porous transport layer adjacent to the cathode. In some embodiments, the anode and the cathode catalysts are platinum group metal (PGM)-free electrocatalysts. The anode and the cathode catalysts are for oxygen evolution reaction and hydrogen evolution reaction, respectively. The anode and the cathode catalysts should have low cost, good electrical conductivity, and good electrocatalytic activity and stability. Suitable cathode catalysts can be selected from, but are not limited to, Ni-based alloys such as Ni—Mo, Ni—Al, Ni—Cr, Ni—Sn, Ni—Co, Ni—W, and Ni—Al—Mo, metal carbides such as $Mo_2C$, metal phosphides such as CoP, metal dichalcogenides such as $MoSe_2$, and mixtures thereof. Suitable anode catalysts can be selected from, but are not limited to, Ni—Fe alloy, Ni—Mo alloy, spinel $Cu_xCo_{3x}O_3$, Ni—Fe layered double hydroxide nanoplates on carbon nanotubes, immobilized metal catalyst on conductive supports, and mixtures thereof.

In some embodiments, the anode comprising an anode catalyst on a first surface of the anion exchange membrane is formed by coating an anode catalyst ink on the first surface of the anion exchange membrane via meniscus coating, knife coating, spray coating, painting, or other known conventional ink coating technologies, followed by drying the coated anion exchange membrane.

In some embodiments, the cathode comprising a cathode catalyst on a second surface of the anion exchange membrane is formed by coating a cathode catalyst ink on the second surface of the anion exchange membrane via meniscus coating, knife coating, spray coating, painting, or other known conventional ink coating technologies, followed by drying the coated anion exchange membrane.

In some embodiments, the anode catalyst ink comprises the anode catalyst, an $OH^-$ exchange ionomer as a binder, and a solvent. In some embodiments, the cathode catalyst ink comprises the cathode catalyst, an $OH^-$ exchange ionomer as a binder, and a solvent. The $OH^-$ exchange ionomer binder creates $OH^-$ transport pathways between the membrane and the reaction sites within the electrodes and thus drastically improves the utilization of the electrocatalyst particles while reducing the internal resistance. The $OH^-$ exchange ionomer binder can have a chemical structure similar to the anion exchange polymer described above, so that the binder will allow low interfacial resistance and similar expansion in contact with water to avoid catalyst delamination, but $OH^-$ conductivity and high oxygen and hydrogen permeance. The solvent can be selected from, but is not limited to, water, alcohol, or a mixture thereof.

The anode porous transport layer and the cathode porous transport layer simultaneously transport electrons, heat, and products with minimum voltage, current, thermal, interfacial, and fluidic losses. The cathode porous transport layer can be made from, but is not limited to, stainless steel, titanium meshes, titanium felts, titanium foams, or carbon-based materials such as non-woven carbon paper, non woven carbon cloth, or woven carbon cloth. The anode porous transport layer can be made from, but is not limited to, stainless steel, titanium meshes, titanium felts, or titanium foams.

EXAMPLES

The following examples are provided to illustrate one or more preferred embodiments of the invention but are not limited embodiments thereof. Numerous variations can be made to the following examples that lie within the scope of the invention.

Example 1: Synthesis of poly(p-terphenyl-9-(6-trimethylammonium bromide)hexyl-9H-carbazole-N,N-dimethyl-4-piperidinium iodide) Anion Exchange Polymer (Abbreviated as PAEM-15

Figure 3:
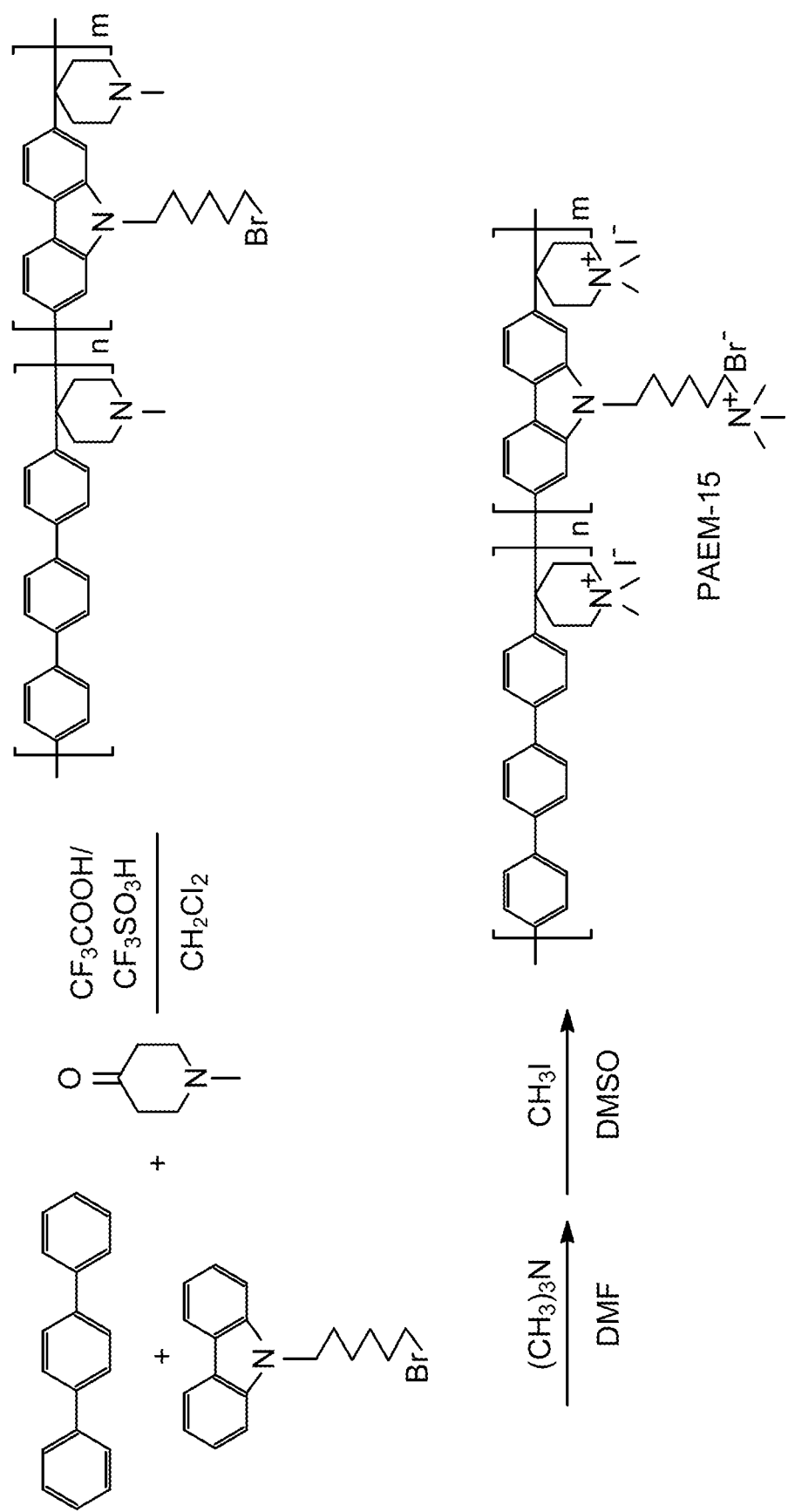
FIG. 3 is an illustration of one embodiment of the synthesis of a PAEM-15 anion exchange polymer.

A poly(p-terphenyl-9-(6-trimethylammonium bromide) hexyl-9H-carbazole-N,N-dimethyl-4-piperidinium iodide) (abbreviated as PAEM-15) was synthesized via a two-step process as showed in FIG. 3: 1) a superacid catalyzed polyhydroxyalkylation reaction of monomers p-terphenyl and 9-(6-bromohexyl)-9H-carbazole with N-methyl-4-piperidone to form a neutral precursor poly(p-terphenyl-9-(6-bromohexyl)-9H-carbazole-N-methyl-4-piperidine) polymer; and 2) Menshutkin reactions to convert the neutral precursor poly(p-terphenyl-9-(6-bromohexyl)-9H-carbazole-N-methyl-4-piperidine) polymer to poly(p-terphenyl-9-(6-trimethylammonium bromide)hexyl-9H-carbazole-N,N-dimethyl-4-piperidinium iodide) anion exchange polymer (abbreviated as PAEM-15).

N-methyl-4-piperidone (13.0 g, 105 mmol), 9-(6-bromohexyl)-9H-carbazole (5.0 g, 15 mmol) and p-terphenyl (19.6 g, 85 mmol) were dissolved into methylene chloride (75 mL) in a 250 mL three-necked flask equipped with an overhead mechanical stirrer. A mixture of trifluoroacetic acid (TFA) (6 ml) and trifluoromethanesulfonic acid (TFSA) (75 ml) was then added dropwise slowly at −3° C. Thereafter, the reaction was continued for 48 h. The resulting viscous solution was poured slowly into ethanol. The resulting solid was filtered, washed with water, and dried at 60° C. under vacuum to form a neutral precursor polyp-terphenyl-9-(6-bromohexyl)-9H-carbazole-N-methyl-4-piperidine) polymer. The yield of poly(p-terphenyl-9-(6-bromohexyl)-9H-carbazole-N-methyl-4-piperidine) polymer was about 94%.

The neutral precursor polyp-terphenyl-9-(6-bromohexyl)-9H-carbazole-N-methyl-4-piperidine) polymer (10.0 g) was dissolved in dimethyl formamide (DMF) (120 mL) in a 200 mL three-necked flask equipped with a mechanical stirrer. A 45 wt % trimethylamine aqueous solution was added slowly to the flask. The mixture was stirred at room temperature for 24 h. The resulting solution was added to deionized water. The resulting solid polymer was rinsed with deionized water several times. The product was collected by filtration and dried under a vacuum at 80° C. for 24 h. The polymer was dissolved in dimethyl sulfoxide (DMSO) (100 mL) in a 200 mL three-necked flask equipped with a mechanical stirrer. Methyl iodide (10 mL) was added quickly. The solution was stirred for 20 h at room temperature and additional 2 h at 60° C. The resulting solution was added slowly to deionized water. The solid was filtered, washed with deionized water, and dried completely at 80° C. under vacuum to form PAEM-15 anion exchange polymer. The yield of PAEM was about 96%.

Example 2: Preparation of PAEM-15 Anion Exchange Polymer Membrane

A PAEM-15 anion exchange polymer membrane was prepared by dissolving the PAEM-15 anion exchange polymer (5.0 g) in DMSO (20 g), casting the solution on a clean glass plate, and drying at 60° C. overnight. The membrane was peeled off from the glass plate and further dried in a vacuum oven at 100° C. for 48 h. The membrane was ion exchanged in 1 M KOH aqueous solution for 10 h to convert PAEM-15 anion exchange polymer with Br⁻ and I⁻ anions to polyp-terphenyl-9-(6-trimethylammonium hydroxide) hexyl-9H-carbazole-N,N-dimethyl-4-piperidinium hydroxide) anion exchange polymer with OH⁻ anions to form polyp-terphenyl-9-(6-trimethylammonium hydroxide) hexyl-9H-carbazole-N,N-dimethyl-4-piperidinium hydroxide) anion exchange polymer membrane (abbreviated as PAEM-15 membrane). The in-plane hydroxide conductivity of the PAEM-15 membrane was 127.8 mS/cm at room temperature.

Specific Embodiments

While the following is described in conjunction with specific embodiments, it will be understood that this description is intended to illustrate and not limit the scope of the preceding description and the appended claims.

A first embodiment of the invention is an anion exchange polymer comprising a plurality of repeating units of formula (I)

wherein $Ar_1$ is selected from the group consisting of

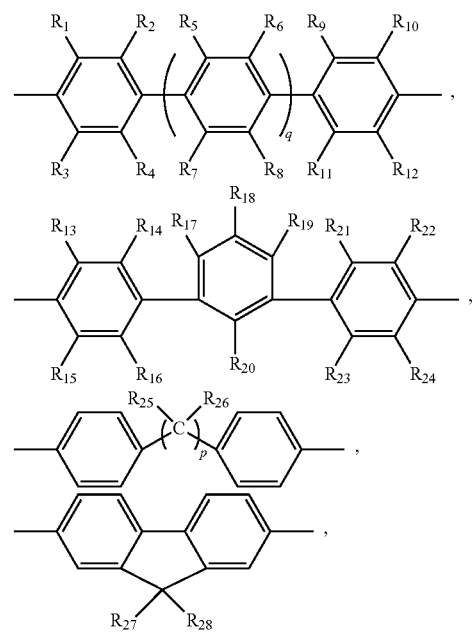

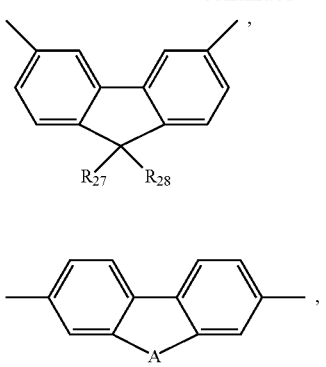
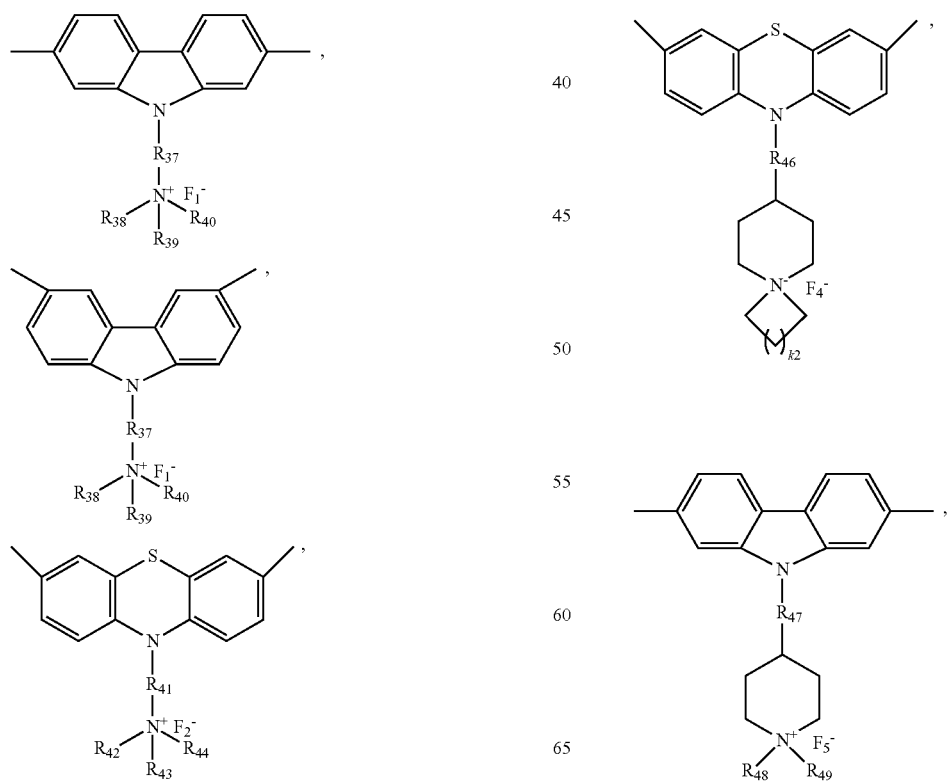
and mixtures thereof; Ar$_2$ is selected from the group consisting of
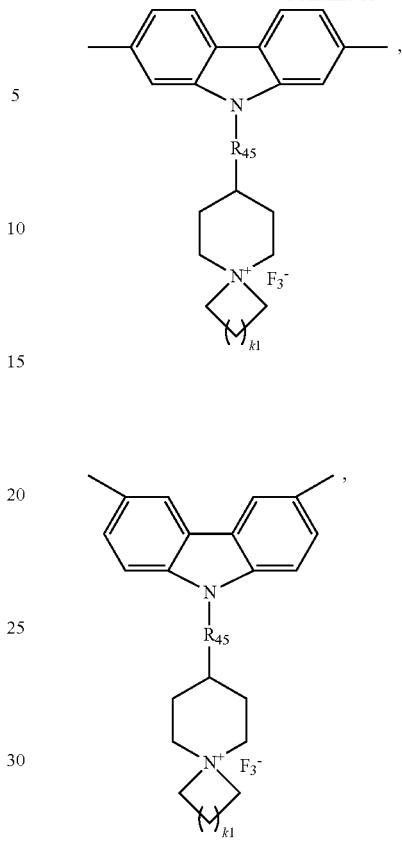

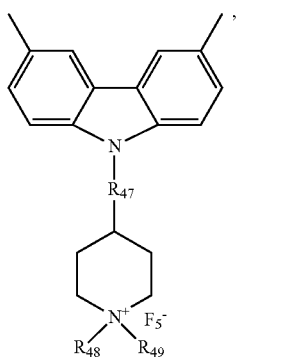

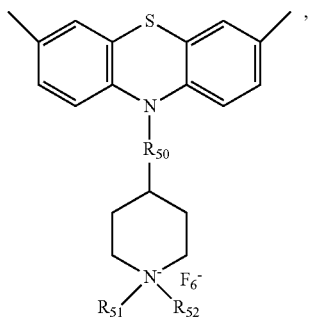

and mixtures thereof; $X_1$ is selected from the group consisting of

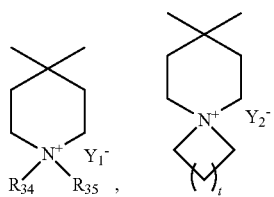

optionally

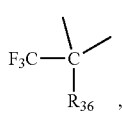

and mixtures thereof; wherein $F_1^-$-$F_6^-$, $Y_1^-$, and $Y_2^-$ are each independently anions; wherein $R_1$-$R_{28}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group; wherein $R_{29}$, $R_{34}$, and $R_{35}$ are each independently hydrogen, an alkyl group, an alkenyl group, an alkynyl group, or an aryl group, and the alkyl, alkenyl, alkynyl or aryl groups are optionally substituted with a halide or a positively charged functional group; wherein $R_{36}$ is an alkyl group, an alkenyl group, an alkynyl group, or an aryl group, and the alkyl, alkenyl, alkynyl or aryl group is optionally substituted with a halide or a positively charged functional group; wherein $R_{37}$-$R_{52}$ are each independently an alkyl group, an alkenyl group, or an aryl group; wherein A is O, S, or $NR_{100}$; wherein $R_{100}$ is hydrogen, an alkyl group, an alkenyl group, an alkynyl group, or an aryl group, and the alkyl, alkenyl, alkynyl, or aryl groups are optionally substituted with a halide or a positively charged functional group; wherein m and n are independently integers from 5 to 500 and the molar ratio of n/m is in a range of 1:20 to 20:1; wherein p is 1, 2, 3, or 4; wherein q is 0, 1, 2, or 3; and wherein t, $k_1$, and $k_2$ are independently 1, 2, 3, 4, 5, or 6. An embodiment of the invention is one, any or all of prior embodiments in this paragraph up through the first embodiment in this paragraph wherein $Ar_1$ is selected from the group consisting of

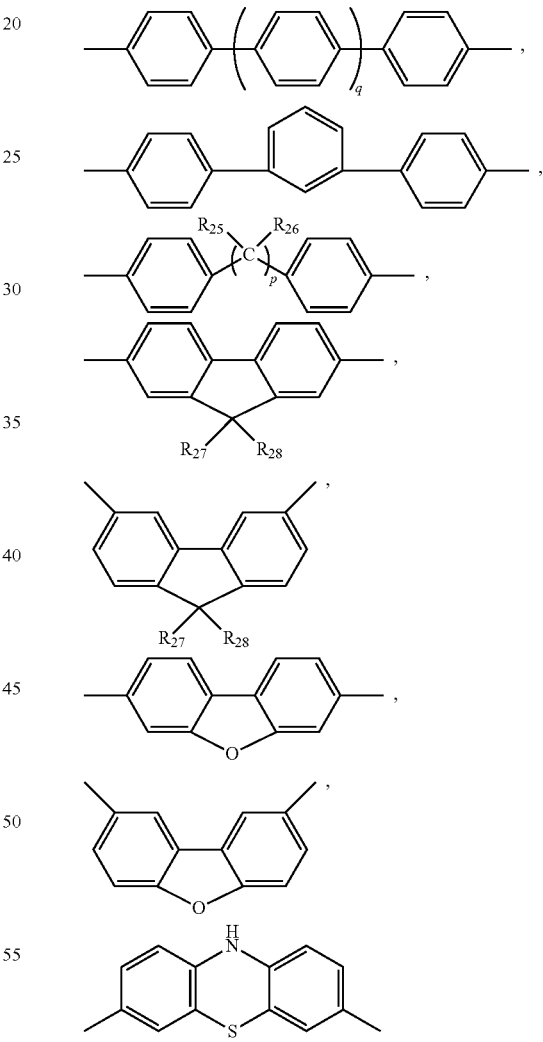

and mixtures thereof; wherein $R_{25}$, $R_{26}$, $R_{27}$, and $R_{28}$ are each independently —H or —$CH_3$; wherein p is 1 or 2; and wherein q is 0 or 1. An embodiment of the invention is one, any or all of prior embodiments in this paragraph up through the first embodiment in this paragraph wherein Are is selected from the group consisting of

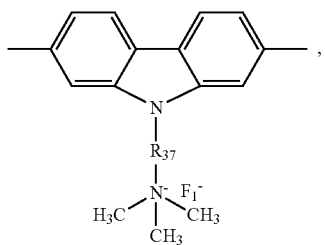
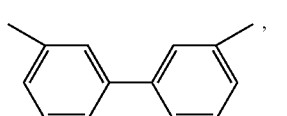
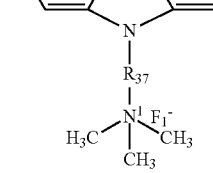
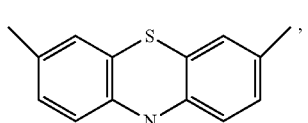
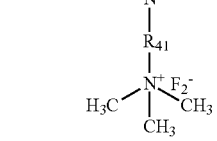
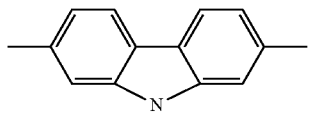
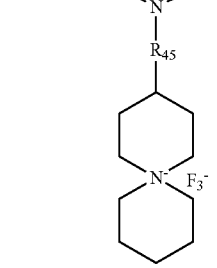
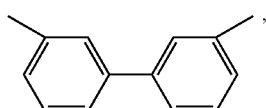
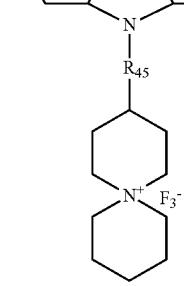
and mixtures thereof, wherein $R_{37}$, $R_{41}$, $R_{45}$, $R_{46}$, $R_{47}$, and $R_{50}$ are each independently —$CH_2$—, —$(CH_2)_2$—, —$(CH_2)_3$—, —$(CH_2)_4$—, —$(CH_2)_5$—, —$(CH_2)_6$—, or —$C_6H_4$—; and wherein $F_1^-$-$F_6^-$ are each independently $OH^-$, $I^-$, or $Br$. An embodiment of the invention is one, any or all of prior embodiments in this paragraph up through the first embodiment in this paragraph wherein $X_1$ is

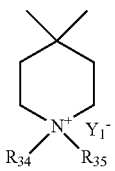

and wherein $R_{34}$ and $R_{35}$ are each independently —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$; and wherein $Y_1^-$ is OH$^-$ or I$^-$. An embodiment of the invention is one, any or all of prior embodiments in this paragraph up through the first embodiment in this paragraph wherein $X_1$ is

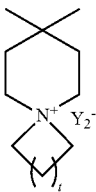

wherein t is 1, 2, 3, 4, 5, or 6; and wherein $Y_2^-$ is OH$^-$ or I$^-$. An embodiment of the invention is one, any or all of prior embodiments in this paragraph up through the first embodiment in this paragraph wherein $X_1$ is a mixture of

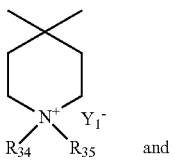 and 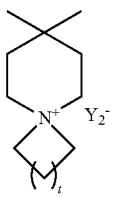

wherein $R_{34}$ and $R_{35}$ are each independently —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$; wherein t is 1, 2, 3, 4, 5, or 6; and wherein $Y_1^-$ and $Y_2^-$ are the same and are selected from OH$^-$ or I$^-$. An embodiment of the invention is one, any or all of prior embodiments in this paragraph up through the first embodiment in this paragraph wherein $X_1$ is a mixture of

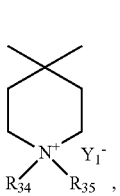 , 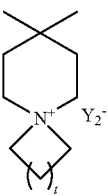 and 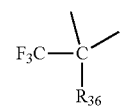

wherein $R_{34}$ and $R_{35}$ are each independently —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$; wherein $R_{36}$ is —CH$_3$, —CH$_2$CH$_3$, —C$_6$H$_5$, or —(CH$_2$)$_5$—N$^+$(CH$_3$)$_3$; wherein t is 1, 2, 3, 4, 5, or 6; and wherein $Y_1^-$ and $Y_2^-$ are the same and are selected from OH$^-$ or I$^-$. An embodiment of the invention is one, any or all of prior embodiments in this paragraph up through the first embodiment in this paragraph wherein the anion exchange polymer is synthesized from monomers $Ar_1'$, $Ar_2'$, and $X_1'$ wherein $Ar_1'$ is selected from the group consisting of

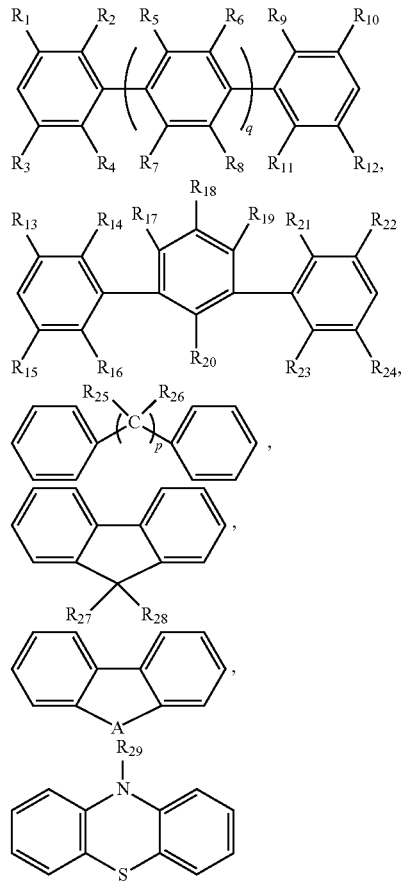

and mixtures thereof; $Ar_2'$ is selected from the group consisting of

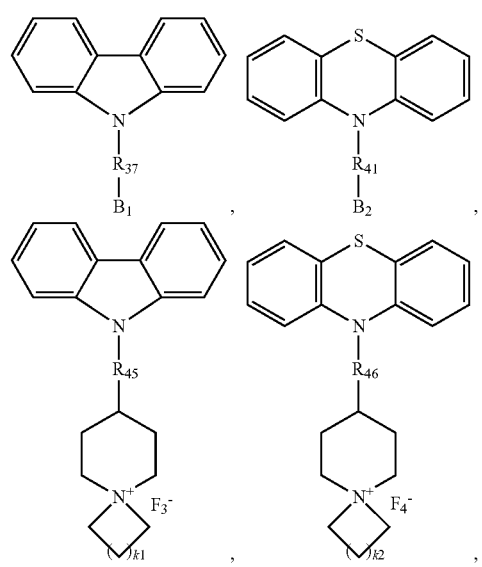

-continued

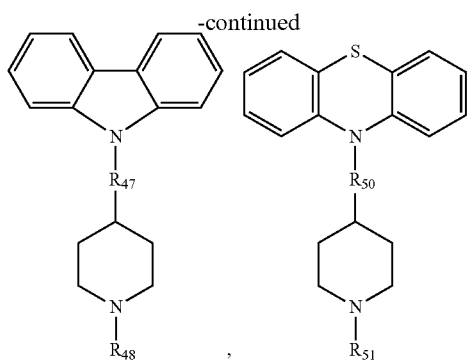

and mixtures thereof; and $X_1'$ is selected from the group consisting of

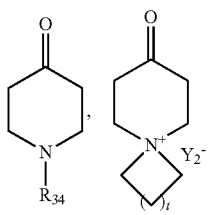

optionally

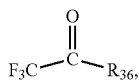

and mixtures thereof; wherein $Y_2^-$, $F_3^-$, and $F_4$ are each independently an anion; wherein $R_1$-$R_{28}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group; wherein $R_{29}$, $R_{34}$, Rog, and $R_{51}$ are each independently hydrogen, an alkyl group, an alkenyl group, an alkynyl group, or an aryl group, and the alkyl, alkenyl, alkynyl or aryl groups are optionally substituted with a halide or a positively charged functional group; wherein $R_{36}$ is an alkyl group, an alkenyl group, an alkynyl group, or an aryl group, and the alkyl, alkenyl, alkynyl or aryl group is optionally substituted with a halide or a positively charged functional group; wherein $R_{37}$, $R_{41}$, $R_{45}$, $R_{46}$, $R_{47}$, and $R_{50}$ are each independently an alkyl group, an alkenyl group, an aryl group, or combinations thereof; wherein $B_1$ and $B_2$ are each independently a halide functional group; wherein A is O, S, or $NR_{100}$; wherein $R_{100}$ is hydrogen, an alkyl group, an alkenyl group, an alkynyl group, or an aryl group, and the alkyl, alkenyl, alkynyl, or aryl groups are optionally substituted with a halide or a positively charged functional group; wherein p is 1, 2, 3, or 4; wherein q is 0, 1, 2, or 3; and wherein t is 1, 2, 3, 4, 5, or 6. An embodiment of the invention is one, any or all of prior embodiments in this paragraph up through the first embodiment in this paragraph wherein $Ar_1'$ is selected from the group consisting of

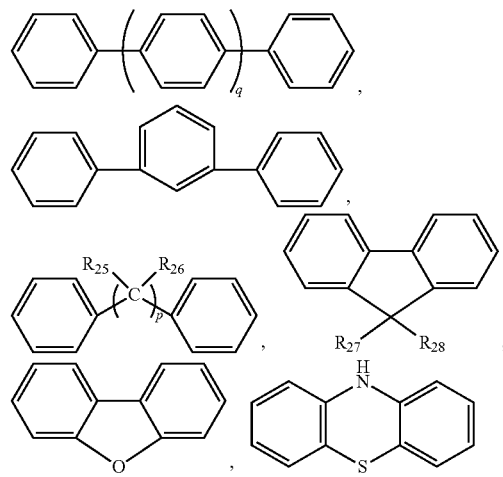

and mixtures thereof; wherein $R_{25}$, $R_{26}$, $R_{27}$, and $R_{28}$ are each independently —H or —$CH_3$; wherein p is 1 or 2; and wherein q is 0 or 1. An embodiment of the invention is one, any or all of prior embodiments in this paragraph up through the first embodiment in this paragraph wherein $Ar_2'$ is selected from the group consisting of

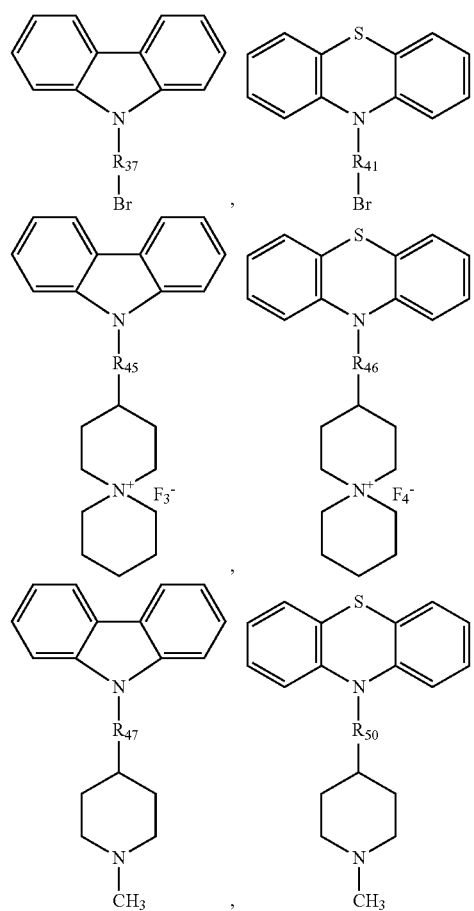

and mixtures thereof; wherein $R_{37}$, $R_{41}$, $R_{45}$, $R_{46}$, $R_{47}$, and $R_{50}$ are each independently —$CH_2$—, —$(CH_2)_2$—, —(CH$_2$)$_3$—, —(CH$_2$)$_4$—, —(CH$_2$)$_5$—, —(CH$_2$)$_6$—, or —C$_6$H$_4$—; wherein F$_3^-$ and F$_4^-$ are independently Br or I$^-$. An embodiment of the invention is one, any or all of prior embodiments in this paragraph up through the first embodiment in this paragraph wherein X$_1$' is

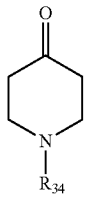

and wherein R$_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$. An embodiment of the invention is one, any or all of prior embodiments in this paragraph up through the first embodiment in this paragraph wherein X$_1$' is

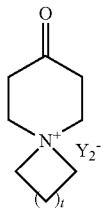

and wherein t is 1, 2, 3, 4, 5, or 6. An embodiment of the invention is one, any or all of prior embodiments in this paragraph up through the first embodiment in this paragraph wherein X$_1$' is a mixture of

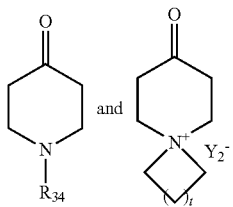

wherein R$_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$; and wherein t is 1, 2, 3, 4, 5, or 6. An embodiment of the invention is one, any or all of prior embodiments in this paragraph up through the first embodiment in this paragraph wherein X$_1$' is a mixture of

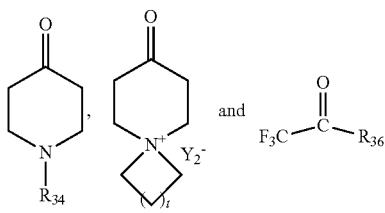

wherein R$_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$;

wherein R$_{36}$ is —CH$_3$, —CH$_2$CH$_3$, —C$_6$H$_5$, or —(CH$_2$)$_5$—N$^+$(CH$_3$)$_3$; and wherein t is 1, 2, 3, 4, 5, or 6.

A second embodiment of the invention is an anion exchange membrane comprising the anion exchange polymer of the first embodiment. An embodiment of the invention is one, any or all of prior embodiments in this paragraph up through the second embodiment in this paragraph, wherein the anion exchange membrane is used in a fuel cell, an electrolyzer, a flow battery, an electrodialyzer, a waste metal recovery system, an electrocatalytic hydrogen production system, a desalinator, a water purifier, a waste water treatment system, an ion exchanger, or a CO$_2$ separator. An embodiment of the invention is one, any or all of prior embodiments in this paragraph up through the second embodiment in this paragraph wherein the anion exchange membrane comprises a nonporous symmetric dense film membrane, an integrally-skinned asymmetric membrane, a reinforced composite membrane, or a thin film composite membrane. An embodiment of the invention is one, any or all of prior embodiments in this paragraph up through the second embodiment in this paragraph wherein the integrally-skinned asymmetric membrane, the reinforced composite membrane, or the thin film composite membrane comprises a porous substrate membrane impregnated or coated with the anion exchange polymer.

A third embodiment of the invention is a membrane electrode assembly, comprising an anion exchange membrane comprising the anion exchange polymer of the first embodiment; an anode comprising an anode catalyst on a first surface of the anion exchange membrane; and a cathode comprising a cathode catalyst on a second surface of the anion exchange membrane. An embodiment of the invention is one, any or all of prior embodiments in this paragraph up through the third embodiment in this paragraph further comprising an anode porous transport layer adjacent to the anode; and a cathode porous transport layer adjacent to the cathode.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An anion exchange polymer comprising a plurality of repeating units of formula (I)

$$\mathrm{+(Ar_1-X_1)_n(Ar_2-X_1)_m} \tag{I}$$

wherein Ar₁ is selected from the group consisting of:
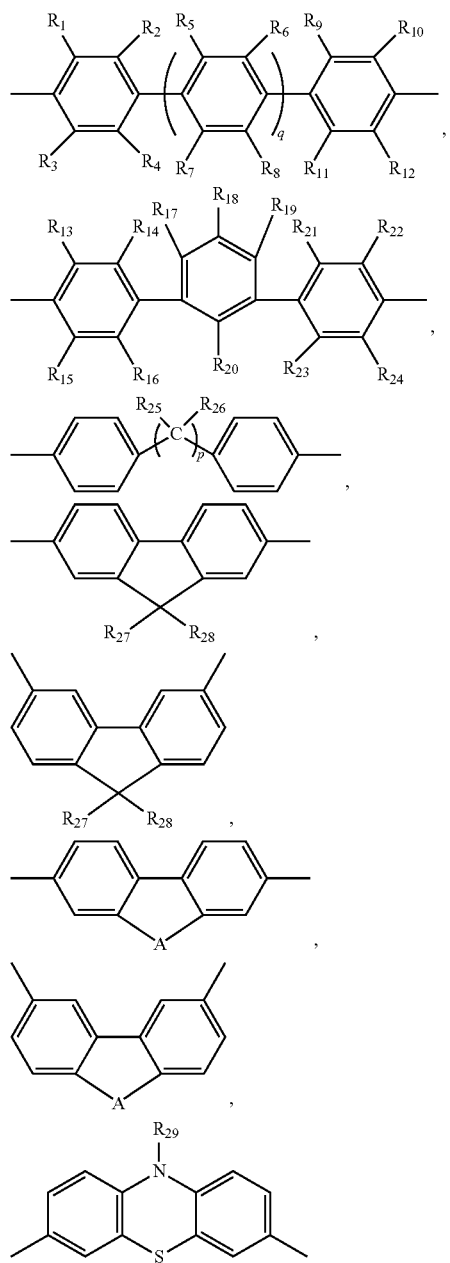
and mixtures thereof,
Ar₂ is selected from the group consisting of:
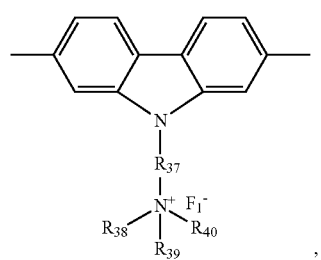
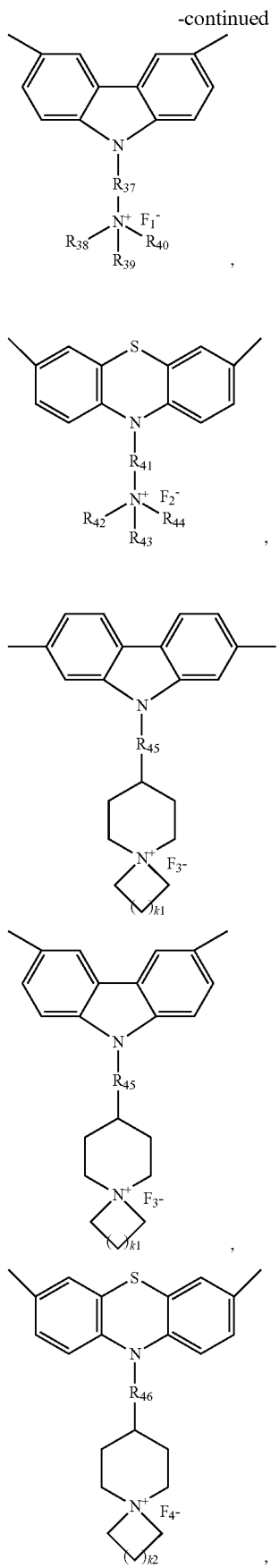

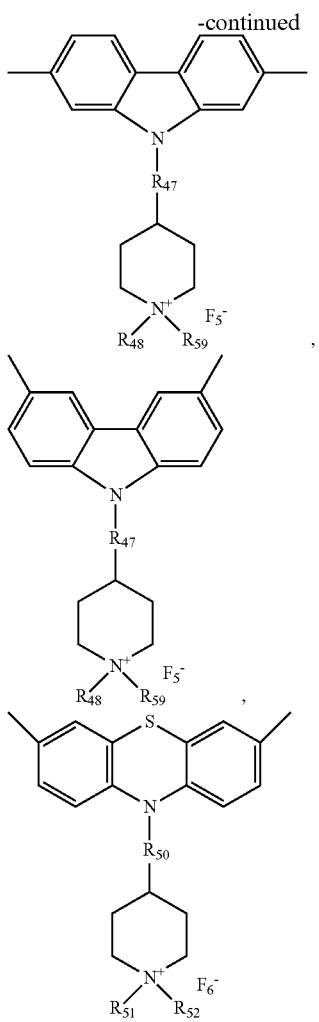

and mixtures thereof,
wherein $X_1$ is a mixture of

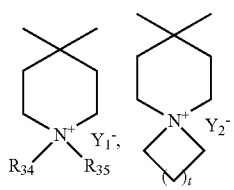

or
wherein $X_1$ is a mixture of

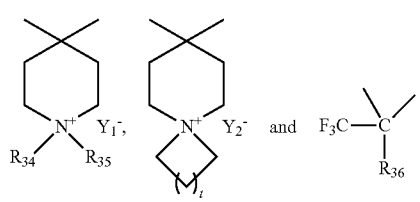

wherein $F_1^-$-$F_6^-$, $Y_1^-$, and $Y_2^-$ are each independently anions;

wherein $R_1$-$R_{28}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group;

wherein $R_{29}$, $R_{34}$, and $R_{35}$ are each independently hydrogen, an alkyl group, an alkenyl group, an alkynyl group, or an aryl group, and the alkyl, alkenyl, alkynyl or aryl groups are optionally substituted with a halide or a positively charged functional group;

wherein $R_{36}$ is an alkyl group, an alkenyl group, an alkynyl group, or an aryl group, and the alkyl, alkenyl, alkynyl or aryl group is optionally substituted with a halide or a positively charged functional group;

wherein $R_{37}$-$R_{52}$ are each independently an alkyl group, an alkenyl group, or an aryl group;

wherein A is O, S, or $NR_{100}$;

wherein $R_{100}$ is hydrogen, an alkyl group, an alkenyl group, an alkynyl group, or an aryl group, and the alkyl, alkenyl, alkynyl, or aryl groups are optionally substituted with a halide or a positively charged functional group;

wherein m and n are independently integers from 5 to 500 and the molar ratio of n/m is in a range of 1:20 to 20:1;

wherein p is 1, 2, 3, or 4;

wherein q is 0, 1, 2, or 3; and wherein t, k1, and k2 are independently 1, 2, 3, 4, 5, or 6.

2. The anion exchange polymer of claim 1 wherein $Ar_1$ is selected from the group consisting of

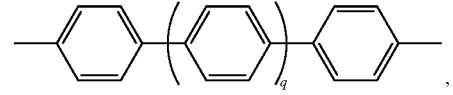

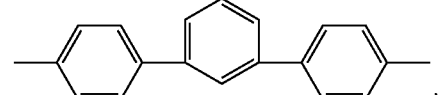

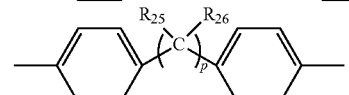

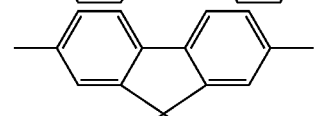

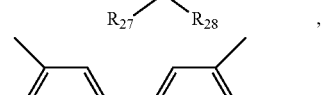

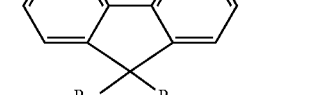

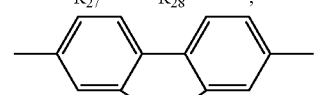

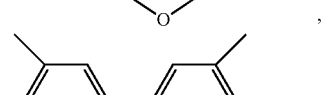

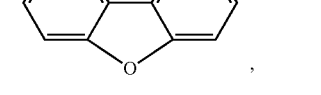

-continued
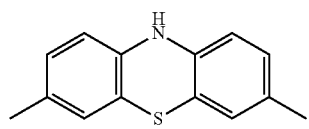
and mixtures thereof,
wherein $R_{25}$, $R_{26}$, $R_{27}$, and $R_{28}$ are each independently —H or —$CH_3$;
wherein p is 1 or 2; and
wherein q is 0 or 1.
3. The anion exchange polymer of claim 1 wherein $Ar_2$ is selected from the group consisting of
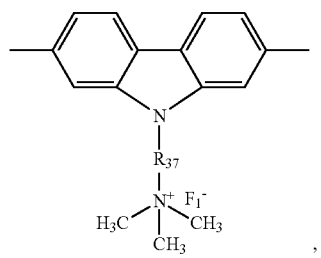
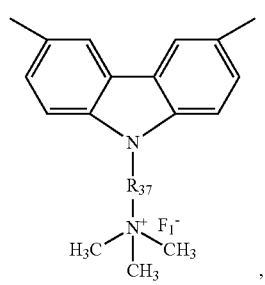
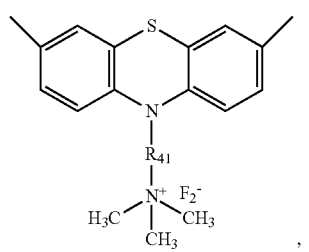
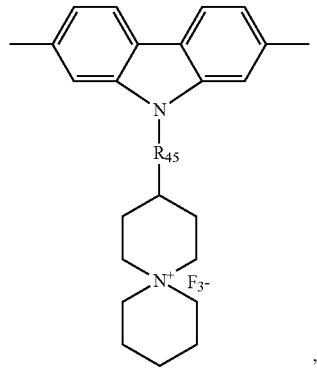
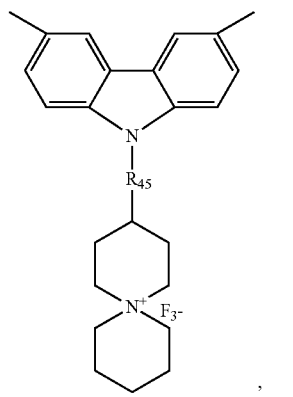
, -continued

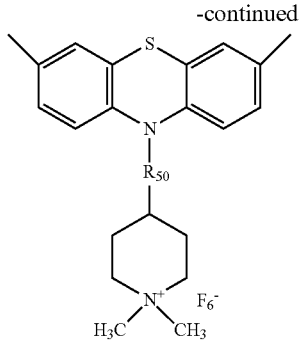

and mixtures thereof, wherein $R_{37}$, $R_{41}$, $R_{45}$, $R_{46}$, $R_{47}$, and $R_{50}$ are each independently —$CH_2$—, —$(CH_2)_2$—, —$(CH_2)_3$—, —$(CH_2)_4$—, —$(CH_2)_5$—, —$(CH_2)_6$—, or —$C_6H_4$—; and wherein $F_1^-$-$F_6^-$ are each independently $OH^-$, $I^-$, or $Br^-$.

4. The anion exchange polymer of claim 1 wherein $X_1$ is the mixture of

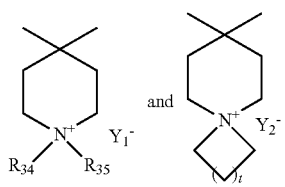

or wherein $X_1$ is the mixture of

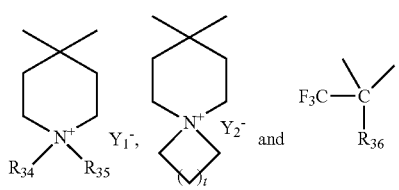

and wherein $R_{34}$ and $R_{35}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $Y_1^-$ is $OH^-$ or $I^-$.

5. The anion exchange polymer of claim 1 wherein $X_1$ is the mixture of

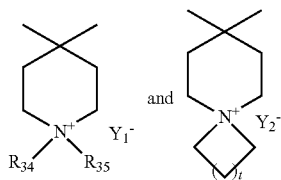

or wherein $X_1$ is the mixture of

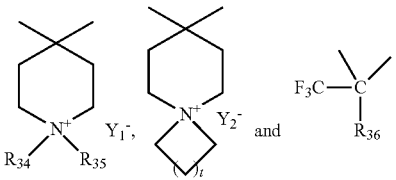

wherein $Y_2^-$ is $OH^-$ or $I^-$.

6. The anion exchange polymer of claim 1 wherein $X_1$ is the mixture of

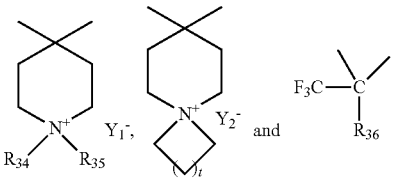

wherein $R_{34}$ and $R_{35}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein t is 1, 2, 3, 4, 5, or 6; and wherein $Y_1^-$ and $Y_2^-$ are the same and are selected from $OH^-$ or $I^-$.

7. The anion exchange polymer of claim 1 wherein $X_1$ is the mixture of

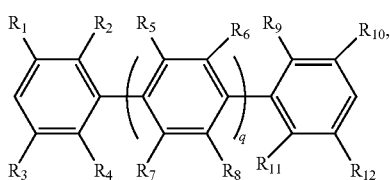

wherein $R_{34}$ and $R_{35}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein $R_{36}$ is —$CH_3$, —$CH_2CH_3$, —$C_6H_5$, or —$(CH_2)_5$—$N^+(CH_3)_3$;

wherein t is 1, 2, 3, 4, 5, or 6; and wherein $Y_1^-$ and $Y_2^-$ are the same and are selected from $OH^-$ or $I^-$.

8. The anion exchange polymer of claim 1 wherein the anion exchange polymer is synthesized from monomers $Ar_1'$, $Ar_2'$, and $X_1'$ wherein $Ar_1'$ is selected from the group consisting of:

-continued

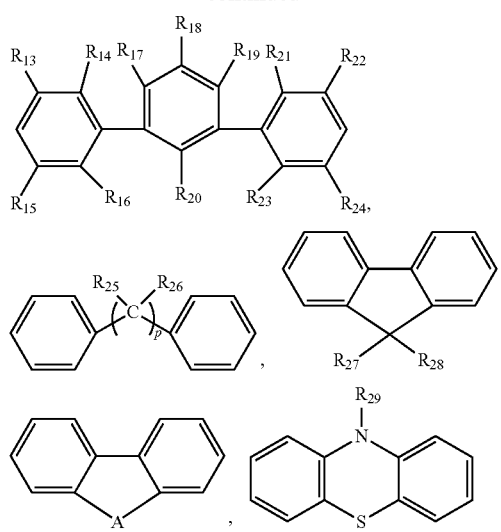

and mixtures thereof,

Ar$_2$' is selected from the group consisting of:

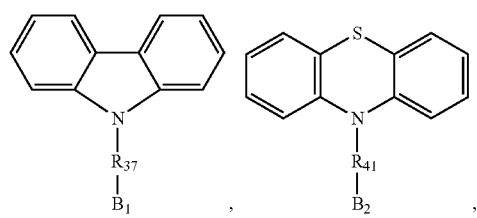

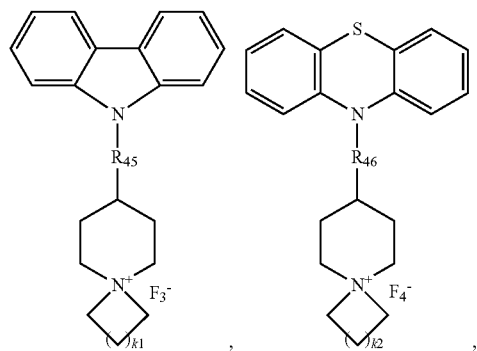

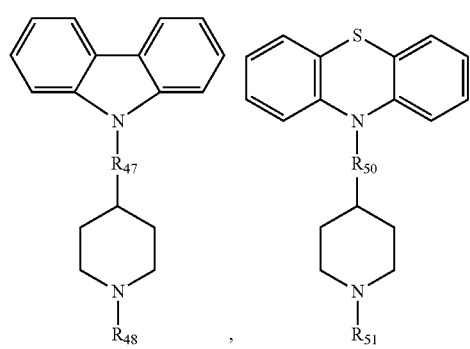

and mixtures thereof; and wherein X$_1$' is a mixture of

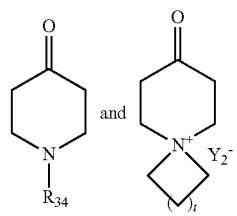

or wherein X$_1$' is a mixture of

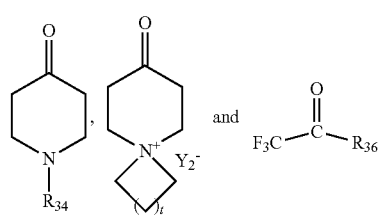

wherein Y$_2^-$, F$_3^-$, and F$_4^-$ are each independently an anion;

wherein R$_1$-R$_{28}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group;

wherein R$_{29}$, R$_{34}$, R$_{48}$, and R$_{51}$ are each independently hydrogen, an alkyl group, an alkenyl group, an alkynyl group, or an aryl group, and the alkyl, alkenyl, alkynyl or aryl groups are optionally substituted with a halide or a positively charged functional group;

wherein R$_{36}$ is an alkyl group, an alkenyl group, an alkynyl group, or an aryl group, and the alkyl, alkenyl, alkynyl or aryl group is optionally substituted with a halide or a positively charged functional group;

wherein R$_{37}$, R$_{41}$, R$_{45}$, R$_{46}$, R$_{47}$, and R$_{50}$ are each independently an alkyl group, an alkenyl group, an aryl group, or combinations thereof, wherein B$_1$ and B$_2$ are each independently a halide functional group;

wherein A is O, S, or NR$_{100}$;

wherein R$_{100}$ is hydrogen, an alkyl group, an alkenyl group, an alkynyl group, or an aryl group, and the alkyl, alkenyl, alkynyl, or aryl groups are optionally substituted with a halide or a positively charged functional group;

wherein p is 1, 2, 3, or 4;

wherein q is 0, 1, 2, or 3; and wherein t is 1, 2, 3, 4, 5, or 6.

9. The anion exchange polymer of claim 8 wherein Ar$_1$' is selected from the group consisting of:

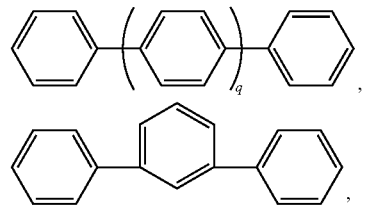

-continued

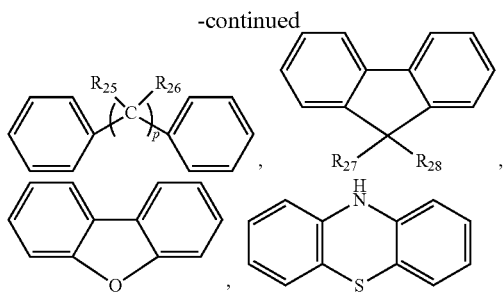, 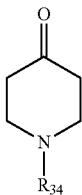, and mixtures thereof,
wherein $R_{25}$, $R_{26}$, $R_{27}$, and $R_{28}$ are each independently —H or —CH$_3$;
wherein p is 1 or 2; and
wherein q is 0 or 1.

10. The anion exchange polymer of claim 8 wherein $Ar_2'$ is selected from the group consisting of:

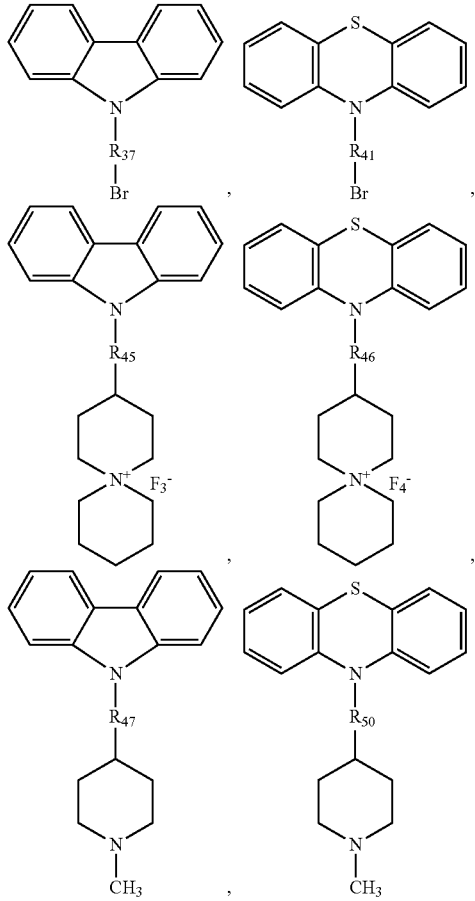

and mixtures thereof,
wherein $R_{37}$, $R_{41}$, $R_{45}$, $R_{46}$, $R_{47}$, and $R_{50}$ are each independently —CH$_2$—, —(CH$_2$)$_2$—, —(CH$_2$)$_3$—, —(CH$_2$)$_4$—, —(CH$_2$)$_5$—, —(CH$_2$)$_6$—, or —C$_6$H$_4$—; and
wherein $F_3^-$ and $F_4^-$ are independently Br$^-$ or I$^-$.

11. The anion exchange polymer of claim 8 wherein $X_1'$ is the mixture of

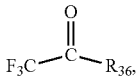

wherein $X_1'$ is the mixture of

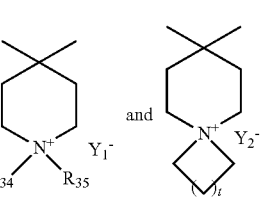, wherein $R_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$.

12. The anion exchange polymer of claim 8 wherein $X_1'$ is the mixture of

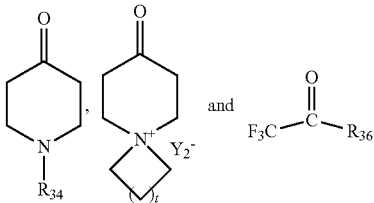

wherein $R_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$;
wherein t is 1, 2, 3, 4, 5, or 6.

13. The anion exchange polymer of claim 8 wherein $X_1'$ is the mixture of wherein $R_{34}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$;
wherein $R_{36}$ is —Ch$_3$, —CH$_2$CH$_3$, —C$_6$H$_5$, or —(CH$_2$)$_5$—N$^+$(CH$_3$)$_3$; and
t is 1, 2, 3, 4, 5, or 6.

14. An anion exchange membrane comprising the anion exchange polymer of claim 1.

15. The anion exchange membrane of claim 14, wherein the anion exchange membrane is used in a fuel cell, an electrolyzer, a flow battery, an electrodialyzer, a waste metal recovery system, an electrocatalytic hydrogen production system, a desalinator, a water purifier, a waste water treatment system, an ion exchanger, or a CO$_2$ separator.

16. The anion exchange membrane of claim 14 wherein the anion exchange membrane comprises a nonporous symmetric dense film membrane, an integrally-skinned asymmetric membrane, a reinforced composite membrane, or a thin film composite membrane.

17. The anion exchange membrane of claim 16 wherein the integrally-skinned asymmetric membrane, the reinforced composite membrane, or the thin film composite membrane comprises a porous substrate membrane impregnated or coated with the anion exchange polymer.

18. A membrane electrode assembly, comprising:
   an anion exchange membrane comprising the anion exchange polymer of claim 1;
   an anode comprising an anode catalyst on a first surface of the anion exchange membrane; and
   a cathode comprising a cathode catalyst on a second surface of the anion exchange membrane.

19. The membrane electrode assembly of claim 18 further comprising:
   an anode porous transport layer adjacent to the anode; and
   a cathode porous transport layer adjacent to the cathode.

\* \* \* \* \*